US006730442B1

(12) United States Patent
Sutherland et al.

(10) Patent No.: US 6,730,442 B1
(45) Date of Patent: May 4, 2004

(54) SYSTEM AND METHOD FOR REPLICATING VOLUME HOLOGRAMS

(75) Inventors: Richard L. Sutherland, Dayton, OH (US); John Sappington, West Alexandria, OH (US); Donna M. Brandelik, New Carlisle, OH (US); Stephen A. Siwecki, Dayton, OH (US); Christina K. Shepherd, Dayton, OH (US); Robert T. Pogue, Springboro, OH (US)

(73) Assignee: Science Applications International Corporation, San Diego, CA (US)

( * ) Notice: Subject to any disclaimer, the term of this patent is extended or adjusted under 35 U.S.C. 154(b) by 0 days.

(21) Appl. No.: 09/577,166

(22) Filed: May 24, 2000

(51) Int. Cl.$^7$ .............................................. G03H 1/02
(52) U.S. Cl. ............................ 430/1; 430/2; 359/12; 359/3
(58) Field of Search ..................... 430/1, 2; 359/12, 359/3

(56) References Cited

U.S. PATENT DOCUMENTS

| | | | |
|---|---|---|---|
| 3,580,655 A | 5/1971 | Leith et al. .................. 350/3.5 |
| 3,658,526 A | 4/1972 | Haugh ........................... 96/27 |
| 3,667,946 A | * 6/1972 | Sturdevant ..................... 430/1 |
| 3,694,218 A | * 9/1972 | Margerum et al. ............. 430/1 |
| 3,758,186 A | 9/1973 | Brumm ....................... 350/3.5 |
| 4,003,629 A | 1/1977 | Baues et al. ............... 350/96 C |
| 4,006,963 A | 2/1977 | Baues et al. ............... 350/97 C |
| 4,018,228 A | 4/1977 | Goosen ....................... 128/305 |
| 4,045,124 A | 8/1977 | Pollack et al. ......... 350/160 LC |
| 4,124,947 A | 11/1978 | Kuhl et al. ..................... 40/453 |
| 4,210,132 A | 7/1980 | Perlin ......................... 128/1 R |
| 4,368,736 A | 1/1983 | Kaster ..................... 128/334 C |
| 4,374,371 A | 2/1983 | Narancic .................... 337/159 |
| 4,416,540 A | 11/1983 | Nicholson ................. 350/3.69 |

(List continued on next page.)

FOREIGN PATENT DOCUMENTS

| | | | | |
|---|---|---|---|---|
| EP | 0087281-a | * | 8/1983 | ................... 359/12 |
| EP | 0 856 765 A1 | | 8/1998 | ......... G02F/1/3333 |
| EP | 0 856 766 A2 | | 8/1998 | ......... G02F/1/1333 |
| EP | 0 856 768 A2 | | 8/1998 | ......... G02F/1/1347 |
| EP | 0 867 749 A2 | | 9/1998 | ......... G02F/1/1335 |
| JP | 60189729 A | | 9/1985 | ........... G02F/1/133 |
| JP | 01-068784-a | * | 3/1989 | ................... 359/12 |
| JP | 03-188479-a | * | 8/1991 | ................... 359/12 |
| JP | 10319237 | | 12/1998 | |
| WO | WO 97/27519 | | 7/1997 | ............ G03H/1/04 |
| WO | WO-98/04650-a | * | 2/1998 | ..................... 430/1 |
| WO | WO 99/09440 | | 2/1999 | ............ G02B/6/12 |

OTHER PUBLICATIONS

Tondiglia, et al., "Volume holographic image storage and elecyro-optic...", Opt. Lett., vol. 20(11) pp. 1325–1327 (Jun. 1995).*

Sutherland et al., "Switchable holograms in new photopolymer..." SPIE vol. 2404, pp. 132–143 (Feb. 1995).*

(List continued on next page.)

*Primary Examiner*—Martin Angebranndt
(74) *Attorney, Agent, or Firm*—Kilpatrick Stockton LLP

(57) ABSTRACT

The present invention offers increased efficiency and quality in the duplication of a master hologram utilizing an improved method of contact printing. This improved method of contact printing employs a polymer-dispersed liquid crystal (PDLC) recording medium as the duplication blank and/or the master hologram material. The optical qualities of the PDLC material described herein provide an improved method of duplication using single beam contact printing regardless of the material comprising the master hologram. Thus, master holograms originally recorded using highly complex optical geometries (e.g., computer generated holograms) are capable of duplication without the need for multiple beam power/intensity balancing and long recording times. The improved hologram contact printing method described herein works with virtually any type of master hologram, including both reflection and transmission holograms.

9 Claims, 15 Drawing Sheets

U.S. PATENT DOCUMENTS

| | | | | |
|---|---|---|---|---|
| 4,560,249 | A | 12/1985 | Nishiwaki et al. | 350/162.17 |
| 4,673,241 | A | 6/1987 | Nishiwaki et al. | 350/3.64 |
| 4,688,900 | A | 8/1987 | Doane et al. | 350/347 V |
| 4,728,547 | A | 3/1988 | Vaz et al. | 428/1 |
| 4,809,713 | A | 3/1989 | Grayzel | 128/785 |
| 4,810,063 | A | 3/1989 | Fergason | 350/347 V |
| 4,818,045 | A * | 4/1989 | Chang | 359/13 |
| 4,818,070 | A | 4/1989 | Gunjima et al. | 350/334 |
| 4,832,424 | A | 5/1989 | McGrew | 350/3.65 |
| 4,832,445 | A * | 5/1989 | Haines et al. | 283/86 |
| 4,856,876 | A | 8/1989 | Fergason | 350/350 F |
| 4,857,425 | A | 8/1989 | Phillips | 430/1 |
| 4,891,152 | A | 1/1990 | Miller et al. | 252/299.01 |
| 4,923,269 | A | 5/1990 | Healey | 350/96.15 |
| 4,929,240 | A | 5/1990 | Kirsch et al. | 606/151 |
| 4,930,674 | A | 6/1990 | Barak | 227/179 |
| 4,938,568 | A * | 7/1990 | Margerum et al. | 350/334 |
| 4,942,102 | A | 7/1990 | Keys et al. | 430/1 |
| 4,983,176 | A | 1/1991 | Cushman et al. | 606/151 |
| 5,003,386 | A | 3/1991 | Doyle et al. | 358/90 |
| 5,011,624 | A | 4/1991 | Yamagishi et al. | 252/299.5 |
| 5,014,709 | A | 5/1991 | Bjelkhagen et al. | 128/654 |
| 5,015,249 | A | 5/1991 | Nakao et al. | 606/142 |
| 5,047,039 | A | 9/1991 | Avant et al. | 606/148 |
| 5,047,040 | A | 9/1991 | Simpson et al. | 606/159 |
| 5,084,203 | A | 1/1992 | Sansone et al. | 252/299.5 |
| 5,096,282 | A | 3/1992 | Margerum et al. | 359/3 |
| 5,105,298 | A | 4/1992 | Schellenberg | 359/3 |
| 5,136,666 | A | 8/1992 | Anderson et al. | 385/24 |
| 5,166,813 | A | 11/1992 | Metz | 359/15 |
| 5,170,925 | A | 12/1992 | Madden et al. | 227/175 |
| 5,174,276 | A | 12/1992 | Crockard | 128/4 |
| 5,182,665 | A | 1/1993 | O'Callaghan et al. | 359/95 |
| 5,188,638 | A | 2/1993 | Tzakis | 606/153 |
| 5,198,912 | A * | 3/1993 | Ingwall et al. | 359/3 |
| 5,210,630 | A | 5/1993 | Heynderickx et al. | 359/106 |
| 5,220,928 | A | 6/1993 | Oddsen et al. | 128/898 |
| 5,227,859 | A | 7/1993 | Leib et al. | 556/347 |
| 5,227,906 | A | 7/1993 | Tokumitsu | 359/117 |
| 5,234,447 | A | 8/1993 | Kaster et al. | 606/153 |
| 5,235,445 | A | 8/1993 | Hirai et al. | 359/52 |
| 5,240,636 | A | 8/1993 | Doane et al. | 252/299.01 |
| 5,258,008 | A | 11/1993 | Wilk | 606/219 |
| 5,264,950 | A | 11/1993 | West et al. | 359/51 |
| 5,270,843 | A | 12/1993 | Wang | 359/52 |
| 5,272,550 | A | 12/1993 | Dickson et al. | 359/3 |
| 5,291,317 | A | 3/1994 | Newswanger | 359/15 |
| 5,303,322 | A | 4/1994 | Winston et al. | 385/146 |
| 5,313,317 | A | 5/1994 | Saburi et al. | 359/13 |
| 5,323,251 | A | 6/1994 | Coates et al. | 359/51 |
| 5,328,800 | A | 7/1994 | Yokoya et al. | 430/203 |
| 5,330,264 | A | 7/1994 | Ando et al. | 359/12 |
| 5,330,486 | A | 7/1994 | Wilk | 606/139 |
| 5,354,498 | A | 10/1994 | Akashi et al. | 252/299.01 |
| 5,356,557 | A | 10/1994 | Jubb et al. | 252/299.01 |
| 5,363,228 | A | 11/1994 | DeJule et al. | 359/117 |
| 5,366,462 | A | 11/1994 | Kaster et al. | 505/153 |
| 5,376,095 | A | 12/1994 | Ortiz | 505/143 |
| 5,384,067 | A | 1/1995 | Doane et al. | 252/299.01 |
| 5,453,338 | A | 9/1995 | Suga et al. | 430/1 |
| 5,471,326 | A * | 11/1995 | Hall et al. | 359/15 |
| 5,488,681 | A | 1/1996 | Deacon et al. | 385/37 |
| 5,499,118 | A * | 3/1996 | Wreede et al. | 359/12 |
| 5,529,861 | A * | 6/1996 | Redfield | 430/1 |
| 5,544,268 | A | 8/1996 | Bischel et al. | 385/4 |
| 5,547,786 | A | 8/1996 | Brandstetter et al. | 430/1 |
| 5,593,615 | A | 1/1997 | Nerad et al. | 252/299.01 |
| 5,641,426 | A | 6/1997 | Nerad et al. | 252/299.01 |
| 5,648,857 | A | 7/1997 | Ando et al. | 359/12 |
| 5,661,533 | A | 8/1997 | Wu et al. | 349/169 |
| 5,661,577 | A | 8/1997 | Jenkins et al. | 359/11 |
| 5,680,233 | A | 10/1997 | Faris et al. | 359/41 |
| 5,682,214 | A * | 10/1997 | Amako et al. | 349/74 |
| 5,695,682 | A | 12/1997 | Doane et al. | 252/299.01 |
| 5,698,134 | A | 12/1997 | Jubb et al. | 252/299.01 |
| 5,698,343 | A | 12/1997 | Sutherland et al. | 430/1 |
| 5,706,375 | A | 1/1998 | Mihailov et al. | 385/24 |
| 5,725,970 | A | 3/1998 | Martin et al. | 430/2 |
| 5,731,853 | A | 3/1998 | Taketomi et al. | 349/15 |
| 5,734,485 | A | 3/1998 | Buchkremer et al. | 359/25 |
| 5,748,272 | A | 5/1998 | Tanaka et al. | 349/86 |
| 5,751,452 | A | 5/1998 | Tanaka et al. | 359/52 |
| 5,771,320 | A | 6/1998 | Stone | 385/16 |
| 5,832,148 | A | 11/1998 | Yariv | 385/16 |
| 5,852,504 | A | 12/1998 | Kato et al. | 369/9 |
| 5,875,012 | A | 2/1999 | Crawford et al. | 349/74 |
| 5,915,051 | A | 6/1999 | Damask et al. | 385/16 |
| 5,930,011 | A * | 7/1999 | Gambogi, Jr. et al. | 430/1 |
| 5,937,115 | A | 8/1999 | Domash | 385/16 |
| 5,942,157 | A | 8/1999 | Sutherland et al. | 252/582 |
| 6,115,152 | A | 9/2000 | Popovich et al. | 359/15 |
| 6,172,778 | B1 | 1/2001 | Reinhorn et al. | 359/15 |
| 6,211,976 | B1 | 4/2001 | Popovich et al. | 359/15 |

OTHER PUBLICATIONS

Siutherland et al., "Development of photopolymer–liquid crystal composite."SPIE vol. 2152, pp. 303–313 (Jan. 1994).*

J. Zhang, et al., "Switchable Holograms Recorded in Liquid Crystalline Monomers," SPIE, vol. 2042, pp. 238–247 (Jan., 1994).

J. Zhang, et al., "Switchable Liquid Crystalline Photopolymer Media for Holography," J. Am. Chem. Soc., vol. 114(4), pp. 1506–1507 (1992).

V. N. Mikhailov, K. T. Weitzel, V. N. Krylov and Urs P. Wild, Pulse Hologram Recording in DuPont's Photopolymer Films, SPIE vol. 3011, pp. 200–202, 1997.

K. Thilo Weitzel, Urs P. Wild, Victor N. Mikhailov and Vitaly N. Krylov, "Hologram recording in DuPont photopolymer films by use of pulse exposure", Optics Letters, vol. 22, No. 24, Dec. 15, 1997.

R. L. Sutherland, L. V. Natarajan, V. P. Tondiglia and T. J. Bunning, Bragg Gratings in an Acrylate Polymer Consisting of Periodic Polymer–Dispersed Liquid–Crystal Planes, Chem. Mater, 1993, 5, 1533–1538.

D. J. Lougnot, N. Noriet, and C. N. Turck, Photopolymers for holographic recording: IV. New self–processing formulations based on β–hydroxy ethyloxazolidone acrylate, Pure Appl. Opt. 2(1993) 383–392.

H. I. Bjelkhagen, J. Chang, and K. Moneke, High–resolution contact Denisyuk holography, Applied Optics, vol. 31, No. 8, pp. 1041–1047, Mar. 10, 1992.

G. von Bally, W, Schmidthaus, H. Sakowski, and W. Mette, Gradient–index optical systems in holographic endoscopy, Applied Optics, vol. 23, No. 11, pp. 1725–1729, Jun. 1, 1984.

A. R. Tokuda, D.C. Auth, A. P. Bruckner, Holocamera for 3–D micrography of the alert human eye, Applied Optics, vol. 19, No. 13, pp. 2219–2225, Jul. 1, 1980.

S. A. Benton, H. S. Mingrace, W. R. Walter, One–step white–light transmission holography, SPIE vol 215 (1980) pp 156–161.

S. A. Benton, H. S. Mingrace, W. R. Walter, One–step white–light transmission holography, SPIE, vol. 212, pp. 2–7 (1979).

G. W. Stroke, A. E. Labeyrie, White–light Reconstruction of Holographic Images Using the Lippmann–Bragg Diffraction Effect, Physics Letters, vol. 20, No. 4, pp. 368–370, Mar. 1, 1966.

Chris C. Bowley, Haiji Yuan, Gregory P. Crawford, "Morphology of Holographically–Formed Polymer Dispersed Liquid Crystals (H–PDLC)", *Mol. Cryst. Liq.*, 1999, vol. 331., pp. 209–216.

G. P. Crawford, T. G. Fiske, L. D. Silverstein, "Reflective Color LCDs Based on H–PDLC and PSCT Technologies", *SID International Symposium Digest of Applications Papers*, May 14–16, 1996, p. 99.

* cited by examiner

SYSTEM AND METHOD FOR REPLICATING VOLUME HOLOGRAMS

BACKGROUND OF THE INVENTION

1. Field of the Invention

The invention pertains to the use of contact holography to form multiple holograms and, more particularly, to the use of contact holography and a master hologram to make replica gratings, lenses, switches and other images wherein one or both of the master hologram and corresponding replica comprise a polymer-dispersed liquid crystal (PDLC) material.

2. Description of the Related Art

Once a hologram has been recorded, whether using simple or complex optical geometries, it is often desired to reproduce or reconstruct the hologram so as to have multiple copies which are substantially identical to the originally recorded hologram. There are numerous methods for reconstructing holograms, however these are cumbersome and involve retracing the steps used to create the original or master hologram. Unfortunately, where complex geometries are involved, this is neither an efficient nor a practical method for performing mass reconstruction.

By way of example, U.S. Pat. No. 3,580,655 to Leith ("Leith") which is incorporated herein by reference, sets forth multiple methods both for formation of the master hologram and for reconstruction of the master hologram, either for viewing or for permanent recording. While the subject matter of the current invention is not centered on the formation of the master hologram, the advantages of the current invention are readily apparent when the complexity of this initial formation is recognized. For example, FIG. 1 (FIG. 7 of Leith) illustrates one of the simplest geometries for forming a master hologram. This simple configuration illustrates the basic components for simple holographic construction, including a coherent light source 10 emitting an incident beam 12. From this incident beam 12, two separate beams are formed. A prism 14 or similar light-splitting or directing device intercepts part of the incident beam 12 and directs a reference beam 16 to a detector plate 18. Simultaneously, a part of the incident beam is diffused by a diffusion screen 20 and diffracts off an object 22, forming an object beam 24, which also passes onto the detector plate 18. The interaction between the reference beam 16 and the object beam 24 produces an off-axis hologram, in the form of multiple Fresnel patterns and interference fringes.

Further in Leith, there is a method and system for using the master hologram from FIG. 1 to produce replicas of the master hologram. FIG. 2*a* represents the simplest system and method for duplicating the master hologram. Referring to prior art FIG. 2*a*, there is an incident beam 12 from a coherent light source 10 which forms two separate beams, a reference beam 16 and an object beam 24. In this case, object beam 24 results from the interaction of part of incident beam 12 with the master hologram 26. Due to the grating effect of the master hologram 26, the object beam is directed along the formation angle and a detector 18 is placed at the intersection of the reference beam 16 and the object beam 24, forming a replica of the interference pattern comprising master hologram 26. In this case, the object beam forms a virtual image of master hologram 26 which is recorded on the detector 18. The real image is not used in the reproduction process.

As is clear to one skilled in the art, this method of master hologram duplication, while viable, results in a number of disadvantages. In any situation involving light traveling through an optical train, there is the potential for misalignment of the optical elements. Further there are inherent efficiency limits for each optical element. These disadvantages can result in unwanted diffraction, reflection, and in some cases aberration of the beams. Additionally, while lasers have improved coherence parameters, coherence length remains an issue. Even the simplest dual beam recording and duplication systems described above require precise alignment for optimal results. The conventional systems above also require multiple optical elements even for the simplest holographic formation geometries. Consequently, complex geometry hologram formation is not available with the Leith system because of the length and requisite multiple components of the optical train.

The prior art also contemplates a single beam master hologram duplication system that greatly reduces the number of necessary optical components. Referred to as contact printing, this system for duplicating a master hologram resembles in many respects the art of photography. The master hologram and a holographic detection plate (e.g., emulsion plate) are placed in optical contact with one another and exposed to light. Photographic development of the holographic detection plate results in a replica master hologram. For a fully successful reproduction, the optical contact between the master hologram and the holographic detection plate must be such that there is no loss of resolution within the interference fringes. Establishing the requisite optical contact has proved to be a significant limiting factor in attempts to use contact printing for duplication of holograms. Consequently, the prior art single-beam contact printing method, though it reduces the number of optical elements necessary for duplication of a master hologram, poses new optical hurdles to the art of hologram replication.

Referring to FIG. 2*b*, a prior art single beam contact printing system is illustrated in accordance with U.S. Pat. No. 5,547,786 to Brandstetter, et al. ("Brandstetter"), the specification of which is incorporated herein by reference. The system of Brandstetter includes a source of monochromatic, collimated light of substantially fixed wavelength such as laser 10 which produces an output beam 12, referred to as the replication or recording beam, and directs that beam through beam conditioning means 80, which preferably comprises lenses 82 and 84, pinhole 86, and filter 88. Lenses 82 and 84 and pinhole 86 are provided to collimate beam 12 and to expand that beam to the desired size filter 88 is provided to control or adjust the intensity or amplitude of beam 12 across its profile as desired. Subsequent to conditioning by means 80, the conditioned beam 12 is directed at a desired angle onto master holographic optical element 26, passes through, and directly enters a phase recording medium 18, such as a photopolymer layer that has been applied onto the backside of the master holographic optical element.

The method for forming the replica within the photopolymer layer requires a polymerization step which is separate from the recording step. Further, the resulting replica hologram is not switchable. Further, the recording mediums currently available as blanks for hologram duplication are limited in their ability to provide optimal optical contact with the master hologram.

Accordingly, there remains a need for a system and method for mass reproduction of holograms, having a single beam contact printing method using an optically superior recording medium.

In conventional contact holography methods and systems, situations exist wherein the use of a static, as opposed to a switchable, master hologram is limiting. First, a static hologram is limited to a single diffraction efficiency, which is always ON (i.e., it cannot be turned OFF). Second, even though a non-recording wavelength theoretically should pass through the static hologram without causing recording in the blank, in practice this is not the case. Instead, a non-recording, incoherent wavelength passing through a static master may result in unwanted scattering and cross-coupling of phase information which can decrease diffraction efficiency, introduce cross-gratings, increase haze, and generally decrease the signal-to-noise properties of the replicated grating. These limitations of the static master hologram result in difficulties with contact recording schemes that require either in situ pre-recording or post-recording irradiation of the blank.

Accordingly, a need remains for a non-static master hologram for use in a contact printing method and system.

BRIEF SUMMARY OF THE INVENTION

The present invention offers increased efficiency and quality in the duplication of a master hologram utilizing an improved method and system of contact printing. A first embodiment of an improved method and system of contact printing employs a polymer-dispersed liquid crystal (PDLC) recording medium as the duplication blank. The optical qualities of the PDLC material described herein provide an improved method of duplication using single beam contact printing regardless of the material comprising the master hologram. Thus, master holograms originally recorded using highly complex optical geometries (e.g., computer generated holograms) are capable of duplication without the need for multiple beam power/intensity balancing and long recording times. The improved hologram contact printing method and system described herein works with virtually any type of master hologram, including both reflection and transmission holograms.

A first embodiment of the present invention describes a system for duplicating a hologram which includes a radiation source for emitting a coherent beam of radiation, a hologram, and a recording substrate comprised of a polymer-dispersed liquid crystal material for recording a replica of the hologram therein. The components of the system are arranged such that the hologram and the recording substrate are in optical contact with one another and they are placed in a path of the coherent beam of radiation.

A second embodiment of the present invention describes a method for duplicating a hologram which includes the following steps of (1) directing a coherent incident radiation beam at a first optical component; (2) transmitting the coherent incident radiation beam through the first optical component forming a transmitted beam, to a second optical component having a hologram recorded therein; and (3) diffracting the transmitted beam via the hologram forming a diffracted radiation beam. The incident beam and the diffracted beam interfere within the first optical component to form a replica of the hologram therein.

A third embodiment of the present invention describes a method for contact recording at least one hologram which includes the following steps of: (1) directing a coherent radiation beam at a first optical component having a hologram recorded therein and (2) diffracting a first portion and transmitting a second portion of the coherent radiation beam through the first optical component to a second optical component. The transmitted beam and the diffracted beam interfere within the second optical component to form a replica of the hologram therein.

A fourth embodiment of the present invention describes a method for contact recording at least one hologram which includes the following steps of: (1) optically contacting at least one master hologram to at least one holographic blank to form a master/blank assembly; (2) exposing the master/blank assembly to a pre-recording beam; (3) exposing the master/blank assembly to a recording beam; and (4) exposing the master/blank assembly to a post-recording beam, wherein the master/blank assembly remains optically contacted throughout each exposure.

A fifth embodiment of the present invention describes a method for contact recording at least one hologram which includes the following steps: (1) optically contacting at least one master hologram to at least one holographic blank to form a master/blank assembly; (2) exposing the master/blank assembly to a recording beam; and (3) exposing the master/blank assembly to a post-recording beam, wherein the master/blank assembly remains optically contacted throughout each exposure.

A sixth embodiment of the present invention describes a system for contact recording at least one hologram which includes at least one master hologram, at least one holographic blank, a pre-recording beam, and a recording beam, wherein the at least one master hologram and the at least one holographic blank are in optical contact during exposure to the pre-recording beam and the recording beam.

A seventh embodiment of the present invention describes a system for contact recording at least one hologram which includes at least one master hologram, at least one holographic blank, a recording beam, and a post-recording beam, wherein the at least one master hologram and the at least one holographic blank are in optical contact during exposure to the recording beam and the post-recording beam.

An eighth embodiment of the present invention describes a system for contact recording at least one hologram which includes at least one master hologram, at least one holographic blank, a pre-recording beam, a recording beam, and a post-recording beam, wherein the at least one master hologram and the at least one holographic blank are in optical contact during exposure to the pre-recording beam, the recording beam, and the post-recording beam.

FIG(S). 11(a)–(b) are multiple beam, multiple master, multiple blank exposure views utilizing a reflective and transmissive switchable H-PDLC master, according to embodiments of the present invention;

FIG(S). 12(a)–(b) are multiple beam, multiple master, multiple blank exposure views utilizing reflective and transmissive switchable H-PDLC masters respectively, to form an RGB stacked replica, according to embodiments of the present invention.

DETAILED DESCRIPTION OF THE INVENTION

Figure 1:
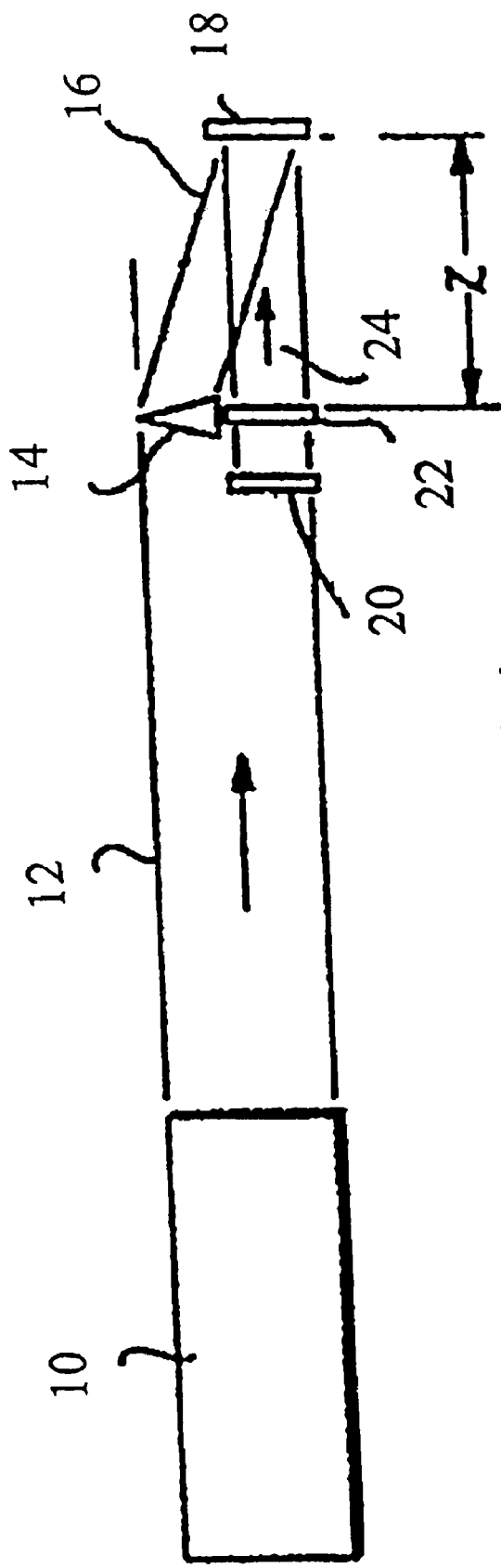
FIG. 1 is a schematic view of a conventional system for forming a master transmission hologram.
Figure 2A:
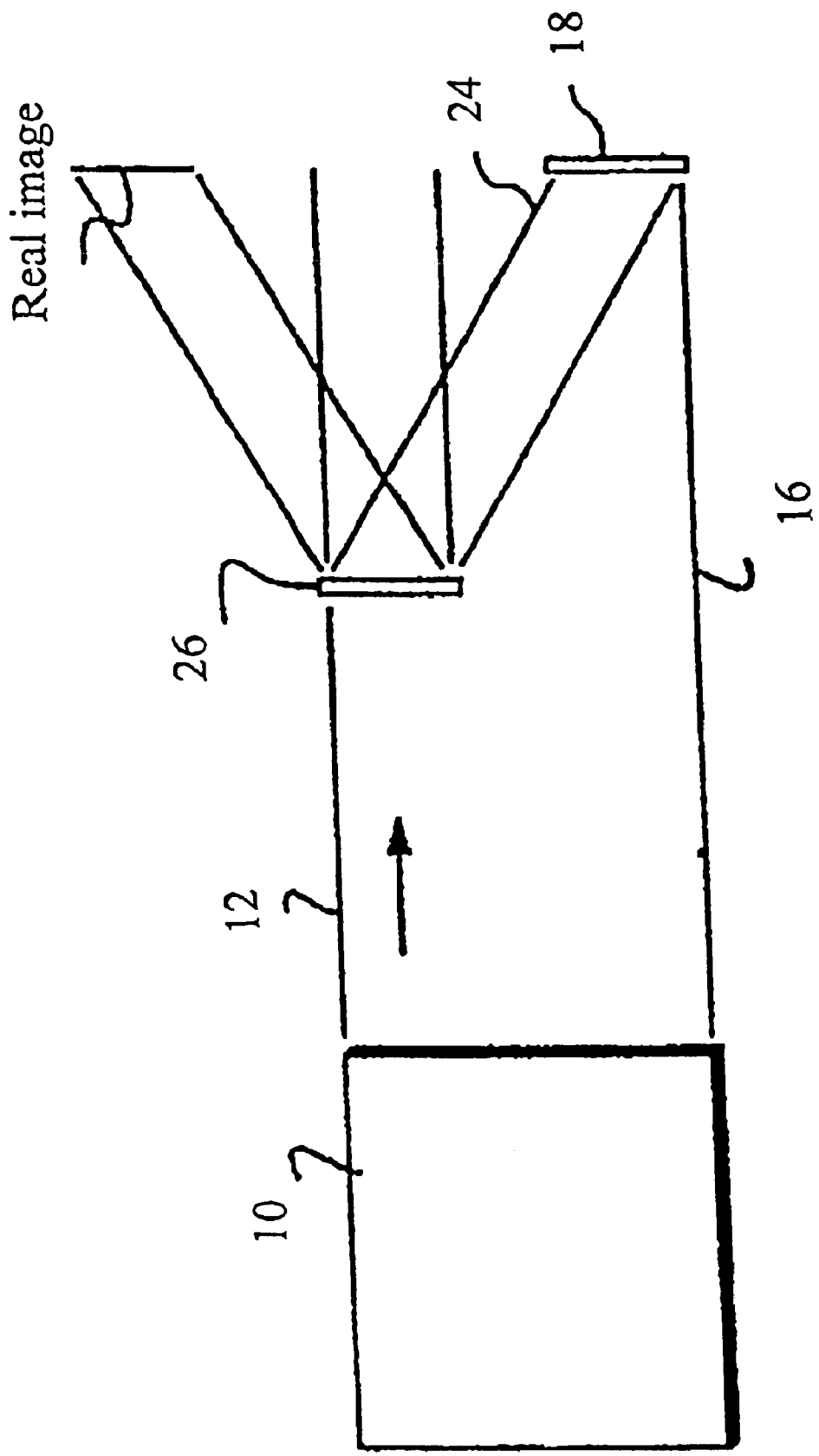
FIG. 2a is a schematic view of a conventional system for forming a replica of the master hologram of FIG. 1.
Figure 2B:
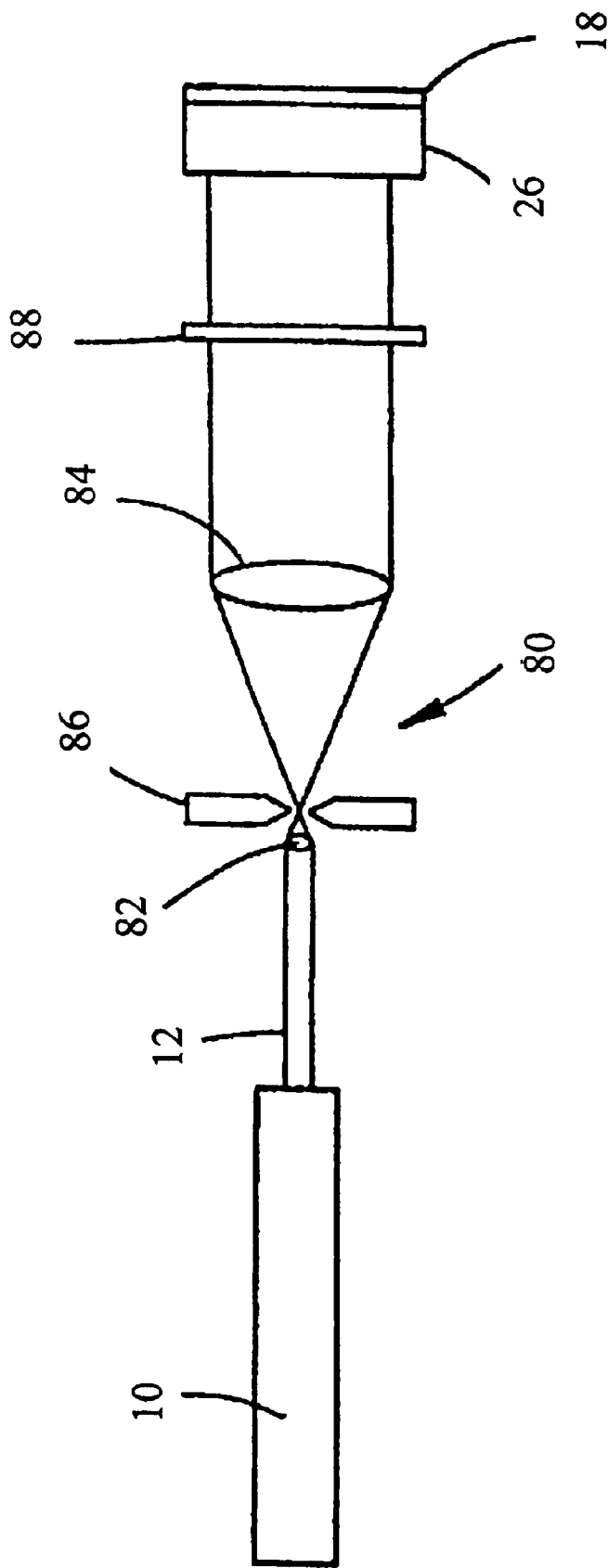
FIG. 2b is a schematic view of a conventional system for forming a replica hologram via a contact printing method.
Figure 3:
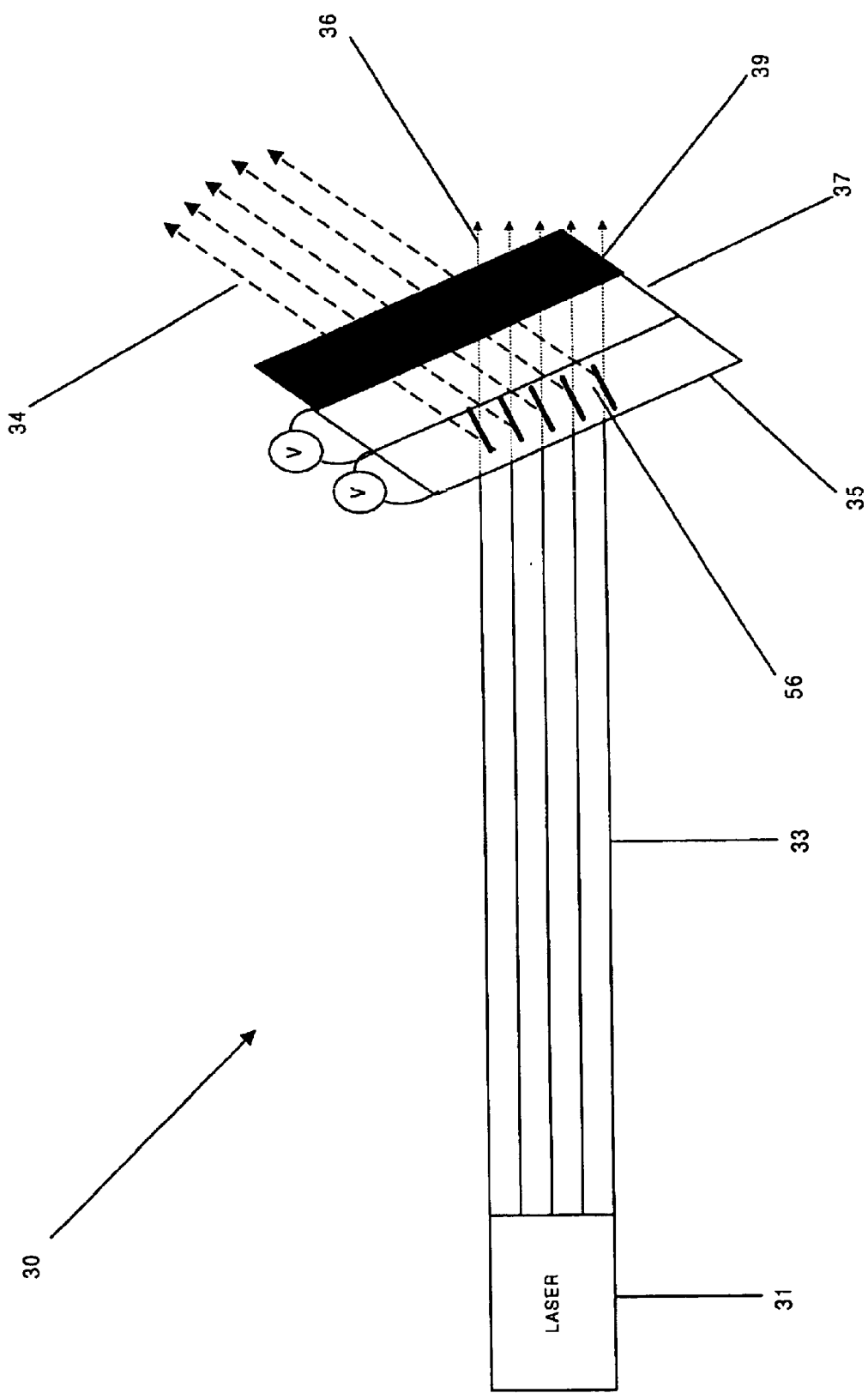
FIG. 3 is a schematic view of a system according to an embodiment of the present invention for forming a replica hologram in a PDLC blank from a master transmission hologram.
Figure 4:
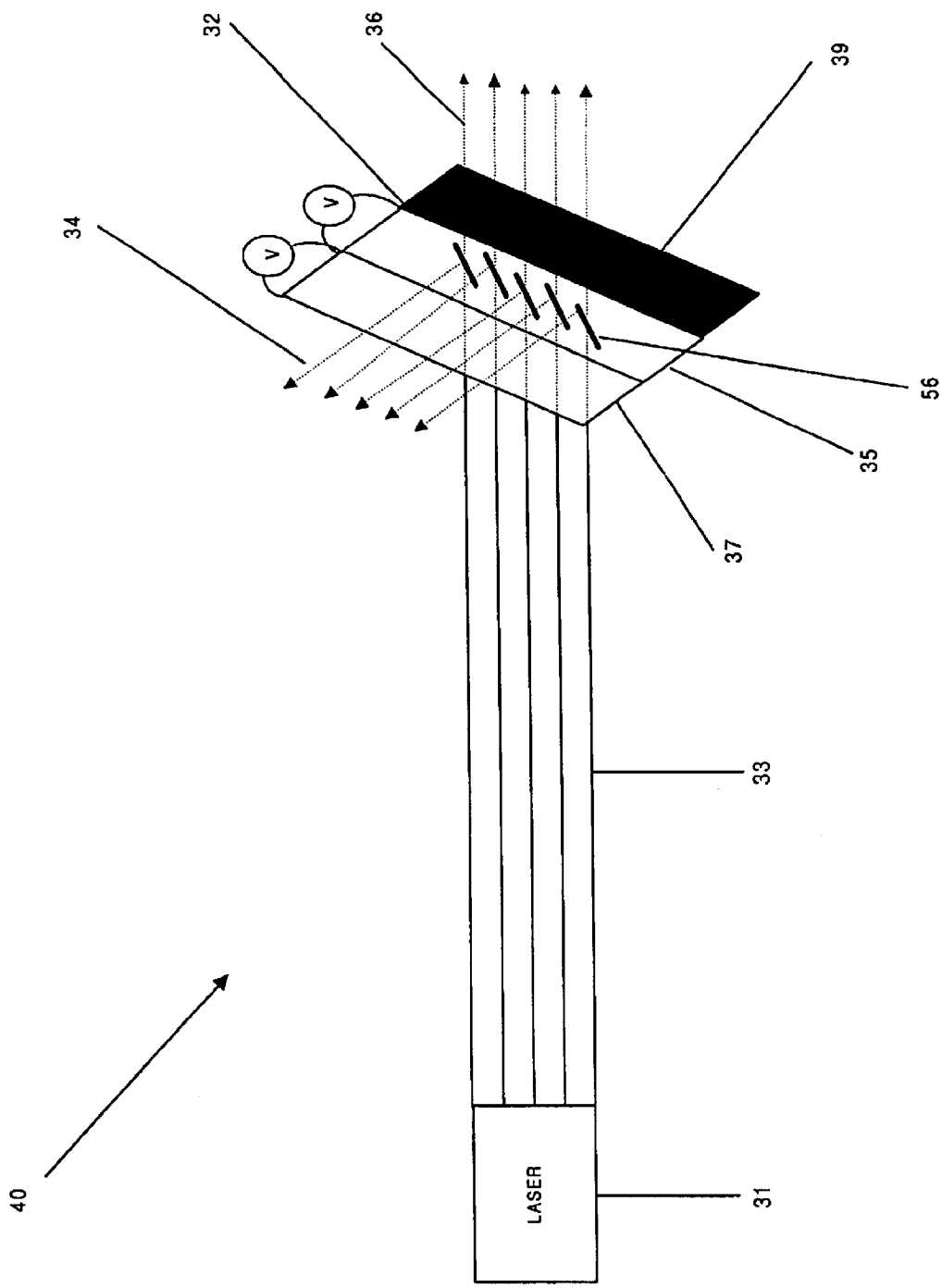
FIG. 4 is a schematic view of a system according to an embodiment of the present invention for forming a replica hologram in a PDLC blank from a master reflection hologram.

Referring to FIGS. 3 and 4, the improved contact printing method and systems described herein comprise the following basic components: a coherent light source 31 emitting an incident beam 33, a master hologram 35 emitting diffracted beam 34 and transmitted beam 36, a polymer-dispersed liquid crystal ("PDLC") blank 37 for recording a replica of the master hologram, and, optionally, an absorption filter 39. As discussed further, the order and placement of these elements with respect to one another vary depending on whether the master hologram is transmissive or reflective.

The PDLC materials described herein may be used in both the PDLC blank 37 and the master hologram 35. However, neither the master hologram 35 nor the blank 37 are limited to this PDLC material. The master hologram 35 may be formed on a conventional photographic plate or similar emulsion-type recording medium, or by computer generation, for example. Similarly, the blank 37 may be formed of an appropriate photosensitive material as determined by one skilled in the art.

In accordance with an embodiment of the present invention there is provided a blank recording or master hologram medium comprised of a PDLC material comprising a monomer, a liquid crystal material, a cross-linking monomer, a coinitiator and a photoinitiator dye. These PDLC materials exhibit clear and orderly separation of the liquid crystal and cured polymer, whereby the PDLC material advantageously provides high quality holographic gratings. The PDLC materials of the present invention are also advantageously formed in a single step. The present invention also utilizes a unique photopolymerizable prepolymer material that permits in situ control of significant characteristics of the resulting gratings, such as domain size, shape, density, ordering, and the like. Furthermore, the methods and materials of the present invention can be used to prepare PDLC materials that function as switchable transmission or reflection holograms or holographic gratings.

Polymer-dispersed liquid crystal materials, methods, and devices contemplated for use in the practice of the present invention are also described in R. L. Sutherland et al., "Bragg Gratings in an Acrylate Polymer Consisting of Periodic Polymer-Dispersed Liquid-Crystal Planes," *Chemistry of Materials*, No. 5, pp. 1533–1538 (1993) ("*Chemistry of Materials*"); R. L. Sutherland, et al., "Electrically Switchable Volume Gratings in Polymer-Dispersed Liquid Crystals," Applied Physics Letters, Vol. 64, No. 9, pp. 1074–1076 (1984); and T. J. Bunning, et al., "The Morphology and Performance of Holographic Transmission Gratings Recorded in Polymer-Dispersed Liquid Crystals," Polymer, Vol. 36, No. 14, pp. 2699–2708 (1995), all of which are fully incorporated by reference into this specification.

The PDLC material employed in the practice of the present invention creates a switchable hologram in a single step. A new feature of a preferred PDLC material is that illumination by an inhomogeneous, coherent light pattern initiates a patterned, anisotropic diffusion (or counter-diffusion) of polymerizable monomer and second phase material, particularly liquid crystal. Thus, alternating well-defined channels of second phase-rich material, separated by well-defined channels of nearly pure polymer, are produced in a single-step process.

A resulting preferred PDLC material has an anisotropic spatial distribution of phase-separated liquid crystal droplets within the photochemically cured polymer matrix. Conventional PDLC materials made by a single-step process can achieve at best only regions of larger liquid crystal droplets and smaller liquid crystal droplets in a polymer matrix. The large bubble sizes are highly scattering, producing a hazy appearance and multiple order diffractions, in contrast to the well-defined first order diffraction and zero order diffraction resulting from the small liquid crystal droplets of the preferred PDLC material in well-defined channels of liquid crystal-rich material. Reasonably well-defined alternately liquid crystal-rich channels and nearly pure polymer channels in a PDLC material are possible by multi-step processes, but such processes do not achieve the precise control of morphology over liquid crystal droplet size and distribution of size and width of the polymer and liquid crystal-rich channels made possible by a preferred PDLC material.

The features of the PDLC material are influenced by the components used in the preparation of the homogeneous starting mixture and, to a lesser extent, by the intensity of the incident light pattern. In a preferred embodiment, the prepolymer material comprises a mixture of a photopolymerizable monomer, a second phase material, a photoinitiator dye, a coinitiator, a chain extender (or cross-linker), and, optionally, a surfactant.

In a preferred embodiment, the two major components of the prepolymer mixture are the polymerizable monomer and the second phase material, which are preferably completely miscible. Highly functionalized monomers are preferred because they form densely cross-linked networks which shrink to some extent and tend to squeeze out the second phase material. As a result, the second phase material is moved anisotropically out of the polymer region and, thereby, separated into well-defined, polymer-poor, second phase-rich regions or domains. Highly functionalized monomers are also preferred because the extensive cross-linking associated with such monomers yields fast kinetics, allowing the hologram to form relatively quickly, whereby the second phase material will exist in domains of less than approximately 0.1 µm.

Highly functionalized monomers, however, are relatively viscous. As a result, these monomers do not tend to mix well with other materials, and they are difficult to spread into thin films. Accordingly, it is preferable to utilize a mixture of pentaacrylates in combination with di-, tri-, and/or tetra-acrylates in order to optimize both the functionality and viscosity of the prepolymer material. Suitable acrylates, such as triethyleneglycol diacrylate, trimethylolpropane triacrylate, pentaerythritol triacrylate, pentaerythritol tetraacrylate, pentaerythritol pentaacrylate, and the like can be used in the present invention. In a preferred embodiment, it has been found that an approximately 1:4 mixture of tri- to penta-acrylate facilitates homogeneous mixing, while providing a favorable mixture for forming 1–100 µm thin films on the optical plates.

The second phase material of choice for use in the practice of the present invention is a liquid crystal. This also allows an electro-optical response in the resulting hologram. The concentration of liquid crystal employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight of liquid crystal typically yield good diffraction efficiency and optical clarity. In prepolymer mixtures utilizing a surfactant, the concentration of liquid crystal may be increased to 35% by weight without loss in optical performance by adjusting the quantity of surfactant. Suitable liquid crystals contemplated for use in the practice of the present invention include the mixture of cyanobiphenyls marketed as E7 by Merck, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, 4-methoxybenzylidene-4'-butylaniline, and the like. Other second phase components are also possible.

By way of example, a polymer-dispersed liquid crystal material employed in the practice of the present invention is formed from a prepolymer material that is a homogeneous mixture of a polymerizable monomer comprising dipentaerythritol hydroxypentaacrylate (available, for example, from Polysciences, Inc., Warrington, Pa.), approximately 10–40% by weight of the liquid crystal E7 (which is a mixture of cyanobiphenyls marketed as E7 by Merck and also available from BDH Chemicals, Ltd., London, England), the chain-extending monomer N-vinylpryrrolidone("NVP") (available from the Aldrich Chemical Company, Milwaukee, Wis.), coinitiator N-phenylgylycine ("NPG") (also available from the Aldrich Chemical Company, Milwaukee, Wis.), and the photoinitiator dye rose bengal ester; (2,4,5,7-tetraiodo-3',4',5',6'-tetrachlorofluroescein-6-acetate ester) marketed as RBAX by Spectragraph, Ltd., Maumee, Ohio). Rose bengal is also available as rose bengal sodium salt (which must be esterfied for solubility) from the Aldrich Chemical Company. This system has a very fast curing speed which results in the formation of small liquid crystal micro-droplets.

Figure 5:
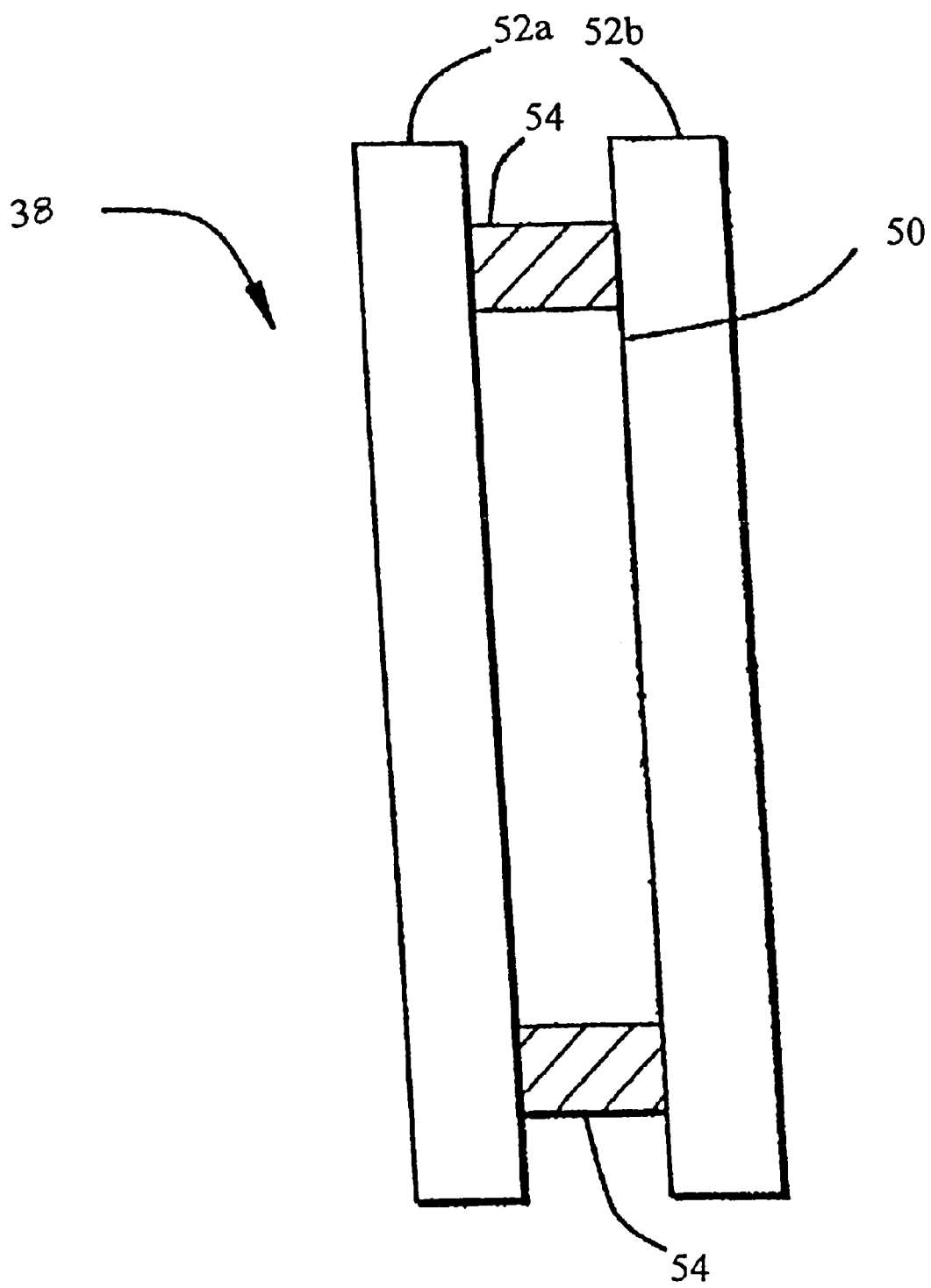
FIG. 5 is a schematic view of a PDLC blank according to an embodiment of the present invention for forming a replica hologram therein.

A preferred example of a PDLC duplication blank 38 is illustrated in FIG. 5. This cross-sectional view of a duplication blank 38 is formed of a layer 50 of the PDLC material sandwiched between a pair of indium-tin-oxide ("ITO") coated glass slides 52a and 52b and spacers 54.

In an exemplary embodiment, the master hologram 35, as shown in FIG. 3 and FIG. 4, is formed from PDLC material.

Figure 6:
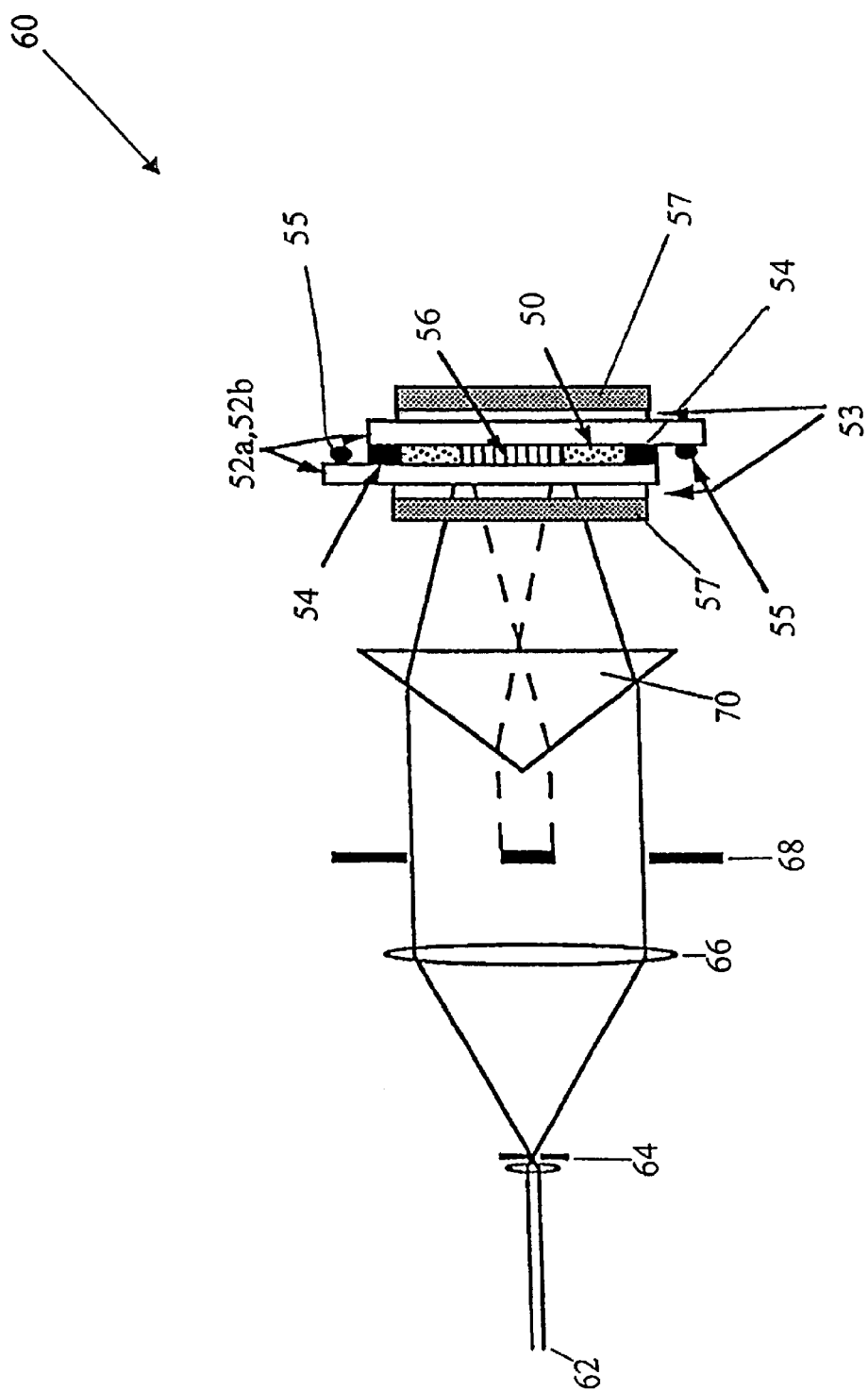
FIG. 6 is a schematic view of a recording system for forming a transmission hologram according to the present invention.

In this embodiment, the interior of master hologram 35 reveals a Bragg transmission grating 56 (FIG. 6) formed when PDLC material layer 50 is exposed to an interference pattern from two intersecting beams of coherent laser light. In FIG. 6, there is shown an exemplary system for recording a master transmission hologram using PDLC materials of the present invention. A coherent light source 62 (e.g., Ar ion laser) is incident upon a spatial filter 64 and a collimating lens 66 prior to being divided via a dual slit aperture 68 and impinging upon a prism 70 causing the dual beams to interfere within the layer of PDLC material 50. Further within this set-up, similar to FIG. 5, the PDLC material is sandwiched between layers of ITO glass slides 52a and 52b, separated by spacers 54. Also, in order to insure optical homogeneity, neutral density filters 57 are placed before slide 52a and after slide 52b, separated by an index matching fluid 53. Finally, in order to allow control of the liquid crystal orientation within the PDLC material, both during and after formation of the hologram, so as to ascertain desired Bragg grating angles, electrodes 55 are provided in electrical contact with the ITO glass slides 52a and 52b. Similarly, one skilled in the art will appreciate the variations and additions of reflective material necessary to form a Bragg reflection grating as opposed to a Bragg transmission grating.

The PDLC material is a mixture of liquid crystal and prepolymer material homogenized to form a viscous solution by suitable means (e.g., ultrasonification) and spread between, for example, ITO coated glass slides with spacers of nominally 1–100 µm thickness and, preferably, 4–20 µm thickness. The ITO is electrically conductive and serves as an optically transparent electrode. Preparation, mixing and transfer of the prepolymer material onto the glass slides are preferably performed in conditions outside of the absorbance spectrum of the selected photoinitiator dye.

The sensitivity of the prepolymer materials to light is dependent on the photoinitiator dye and its concentration. Higher dye concentration leads to higher sensitivity. In most cases, however, the solubility of the photoinitiator dye limits the concentration of the dye and, thus, the sensitivity of the prepolymer material. Nevertheless, it has been found that for most general applications photoinitiator dye concentrations in the range of 0.2–0.4% by weight are sufficient to achieve desirable sensitivities and allow for a complete bleaching of the dye in the recording process, resulting in colorless final samples. Photoinitiator dyes that are useful in generating PDLC materials in accordance with the present invention are rose bengal ester (2,4,5,7-tetraiodo-3',4',5',6'-tetrachlorofluroescein-6-acetate ester); rose bengal sodium salt; eosin; eosin sodium salt; 4,5-diiodosuccinyl fluorescein; camphorquinone; methylene blue; and the like. These dyes allow a sensitivity to recording wavelengths across the visible spectrum from nominally 400 nm to 700 nm. Suitable near-infrared dyes, such as cationic cyanine dyes with trialkylborate anions having absorption from 600–900 nm, as well as merocyanine dyes derived from spiropyran, should also find utility in connection with the present invention.

The coinitiator employed in the practice of the present invention controls the rate of curing in the free radical polymerization reaction of the prepolymer material. Optimum phase separation and, thus, optimum diffraction efficiency in the resulting PDLC material are a function of curing rate. It has been found that favorable results can be achieved utilizing the coinitiator in the range of 2–3% by weight. Suitable coinitiators include N-phenylglycine; triethylene amine; triethanolamine; N,N-dimethyl-2,6-diisopropyl aniline; and the like.

Other suitable dyes and dye-coinitiator combinations that should be suitable for use in the present invention, particularly for visible light, include eosin and triethanolamine; camphorquinone and N-phenyglycine; fluorescein and triethanolamine; methylene blue and triethanolamine or N-phenylglycine; erythrosin B and triethanolamine; indolinocarbocyanine and triphenyl borate; iodobenzospiropyran and triethylamine; and the like.

The chain extender (or cross-linker) employed in the practice of the present invention helps to increase the solubility of the components in the prepolymer material, as well as increase the speed of polymerization. The chain extender is preferably a smaller vinyl monomer as compared with the pentaacrylate, whereby it can react with the acrylate positions in the pentaacrylate monomer, which are not easily accessible to neighboring pentaacrylate monomers as a result of steric hindrance. Thus, reaction of the chain extender monomer with the polymer increases the propagation length of the growing polymer and results in high molecular weights. It has been found that a chain extender in the range of 10–18% by weight maximizes the performance in terms of diffraction efficiency. In a preferred embodiment, it is expected that suitable chain extenders can be selected from the following: N-vinyl pyrrolidone; N-vinyl pyridine; acrylonitrile; N-vinyl carbazole; and the like.

It has been found that the addition of a surfactant material, for example, octanoic acid, in the prepolymer material lowers the switching voltage and improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phase-separated liquid crystal droplets. Scanning electron microscopy ("SEM") studies have shown that droplet sizes in PDLC materials including surfactants are reduced to the range of 30–50 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (dependent mostly on liquid crystal concentration) after which there is a large decrease in diffraction efficiency, as well as an increase in switching voltage (possibly due to a reduction in total phase separation of liquid crystal). Suitable surfactants include octanoic acid; heptanoic acid; hexanoic acid; dodecanoic acid; decanoic acid; and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time.

Thus, it is desirable to reduce the high conductivity introduced by the surfactant, without sacrificing the high diffraction efficiency and the low switching voltages. It has been found that suitable electrically switchable gratings can be formed from a polymerizable monomer, vinyl neononanoate ("VN") $C_8H_{17\ CO2\ CH=CH2}$, commercially available from the Aldrich Chemical Co. in Milwaukee, Wisconsin. Favorable results have also been obtained where the chain extender NVP and the surfactant octanoic acid are replaced by 6.5% by weight VN. VN also acts as a chain extender due to the presence of the reactive acrylate monomer group. In these variations, high optical quality samples were obtained with about 70% diffraction efficiency, and the resulting gratings could be electrically switched by an applied field of 6 V/$\mu$m.

PDLC materials in accordance with the present invention may also be formed using a liquid crystalline bifunctional acrylate as the monomer ("liquid crystal monomer"). The liquid crystal monomers have an advantage over conventional acrylate monomers due to their high compatibility with the low molecular weight nematic liquid crystal materials, thereby facilitating formation of high concentrations of low molecular weight liquid crystal and yielding a sample with high optical quality. The presence of higher concentrations of low molecular weight liquid crystals in the PDLC material greatly lowers the switching voltages (e.g., to ~2 V/$\mu$m). Another advantage of using liquid crystal monomers is that it is possible to apply low AC or DC fields while recording holograms to pre-align the host liquid crystal monomers and the low molecular weight liquid crystal so that a desired orientation and configuration of the nematic directors can be obtained in the liquid crystal droplets. The chemical formulae of several suitable liquid crystal monomers are as follows:

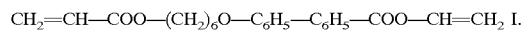

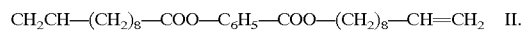

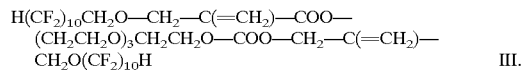

Semifluorinated polymers are known to show weaker anchoring properties and also significantly reduced switching fields. Thus, it is believed that semifluorinated acrylate monomers, which are bifunctional and liquid crystalline will find suitable application in the present invention.

In a preferred embodiment, the prepolymer material utilized to make a reflection grating comprises a monomer, a liquid crystal, a cross-linking monomer, a coinitiator, and a photoinitiator dye. In a preferred embodiment, the reflection grating is formed from prepolymer material comprising by total weight the monomer dipentaerythritol hydroxypentaacrylate ("DPHPA"), 34% by total weight of a liquid crystal comprising a mixture of cyano biphenyls (known commercially as "E7"), 10% by total weight of a cross-linking monomer comprising NVP, 2.5% by weight of the coinitiator N-phenylglycine ("NPG"), and $10^{-5}$ to $10^{-6}$ gram moles of a photoinitiator dye comprising rose bengal ester. Further, as with transmission gratings, the addition of surfactants is expected to facilitate the same advantageous properties discussed above in connection with transmission gratings. It is also expected that similar ranges and variation of prepolymer starting materials will find ready application in the formation of suitable reflection gratings.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 7a, grating 130 includes periodic planes of polymer channels 130a and PDLC channels 130b which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Furthermore, the droplets that were present in the material were significantly smaller, having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity regions versus low intensity regions is much smaller. Thus, gelation occurs more quickly and droplet growth is minimized. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. For example, given a PDLC materials formed with a 488 nm line of an argon ion laser, a resulting reflection notch may have a reflection wavelength at approximately 472 nm for normal incidence and a relatively narrow bandwidth. This small difference between the writing wavelength and the reflection wavelength (approximately 3%) indicates that shrinkage of the film is not a significant problem under these exemplary conditions. Further, one skilled in the art recognizes that multiple write/reflect conditions are easily obtainable according to desired specifications and manipulations and adjustments to the recording geometry may also account for shrinkage, thus minimizing any resulting negative effects. Moreover, it has been found that the performance of such gratings is stable over periods of many months.

In addition to the materials utilized in a preferred embodiment described above, it is believed that suitable PDLC materials could be prepared utilizing monomers such as triethyleneglycol diacrylate, trimethylolpropane triacrylate, pentaerythritol triacrylate, pentaerythritol tetraacrylate, pentaerythritol pentaacrylate, and the like. Similarly, other coinitiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an argon ion laser, the photoinitiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals, such as 4'-pentyl-4-cyanobiphenyl or 4'-heptyl-4-cyanobiphenyl, can be utilized in accordance with the invention.

Figure 7B:
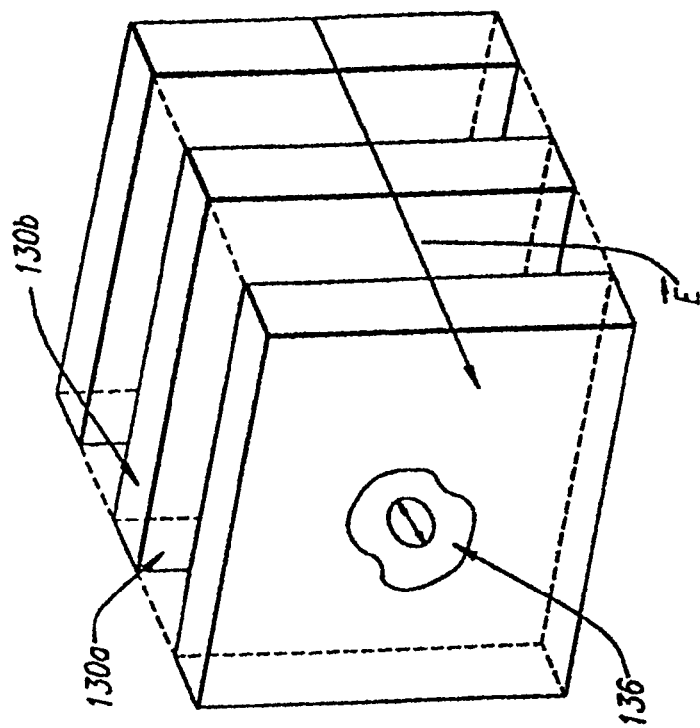
FIGS. 7a and 7b are elevational views of a reflection grating in accordance with the present invention having planes of polymer channels and liquid crystal channels disposed parallel to the front surface, in the absence of a field (FIG. 7a) and with an electric field applied (FIG. 7b), wherein the liquid crystal utilized in the formation of the grating has a positive dielectric anisotropy.
Figure 7A:
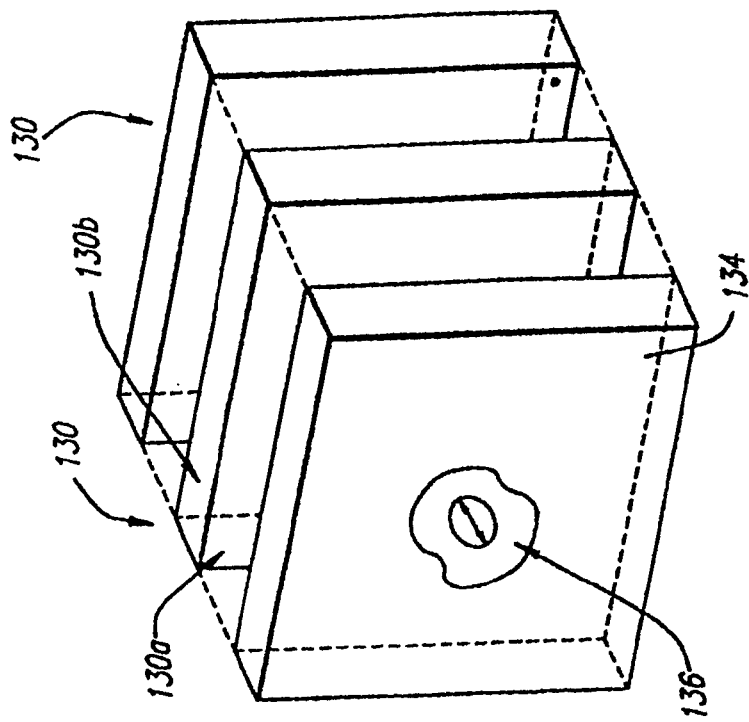

Referring again to FIG. 7a, there is shown an elevational view of a reflection grating 130 in accordance with the invention having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 7b, the symmetry axis 136 is already in a low energy state in alignment with the field E and will not reorient. Thus, reflection gratings formed in accordance with the procedure described above will not normally be switchable.

In general, a reflection grating tends to reflect a narrow wavelength band, such that the grating can be used as a reflection filter. In a preferred embodiment, however, the reflection grating is formed so that it will be switchable. In accordance with the present invention, switchable reflection gratings can be made utilizing negative dielectric anisotropy liquid crystals (or liquid crystals with a low cross-over frequency), an applied magnetic field, an applied shear stress field, or slanted gratings.

Figure 8B:
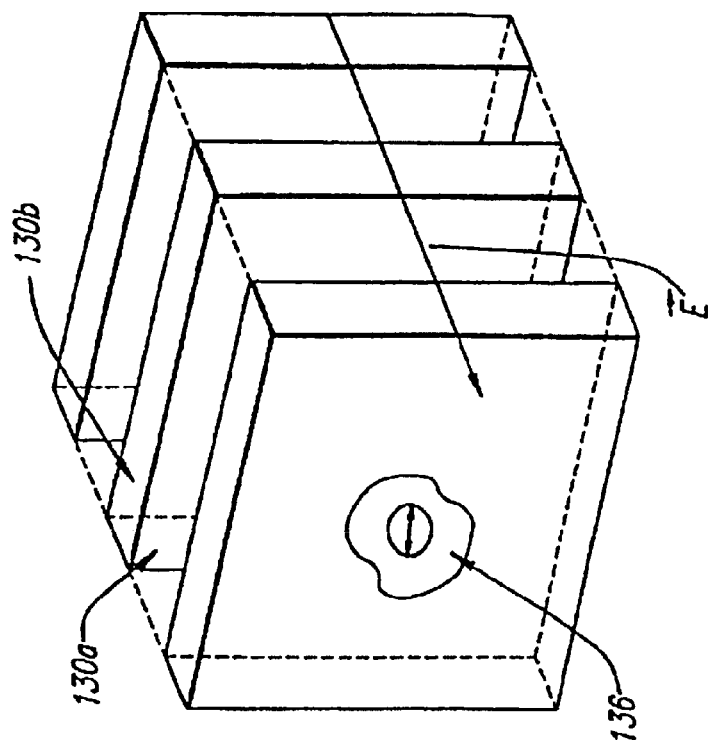
FIGS. 8a and 8b are elevational views of a reflection grating in accordance with the invention having planes of polymer channels and liquid crystal channels disposed parallel to the front surface of the grating, in the absence of an electric field (FIG. 8a) and with an electric field applied (FIG. 8b), wherein the liquid crystal utilized in the formation of the grating has a negative dielectric anisotropy.
Figure 8A:
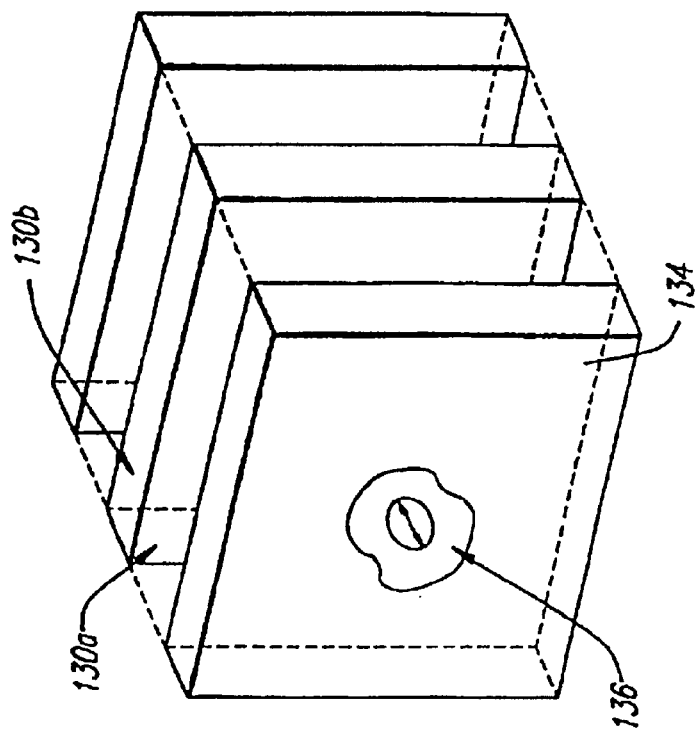

It is known that liquid crystals having a negative dielectric anisotropy ($\Delta\epsilon$) will rotate in a direction perpendicular to an applied field. As shown in FIG. 8a, the symmetry axis 136 of the liquid crystal domains formed with a liquid crystal having a negative $\Delta\epsilon$ will also be disposed in a direction perpendicular to the periodic channels 130a and 130b of the grating 130 and to the front surface 134 of the grating. However, when an electric field E is applied across such gratings, as shown in FIG. 8b, the symmetry axis of the negative $\Delta\epsilon$ liquid crystal will distort and reorient in a direction perpendicular to the field E, which is perpendicular to the film and the periodic planes of the grating. As a result, the reflection grating can be switched between a state where it is reflective and a state where it is transmissive. The following negative $\Delta\epsilon$ liquid crystal and others are expected to find ready application in the methods and devices of the present invention:

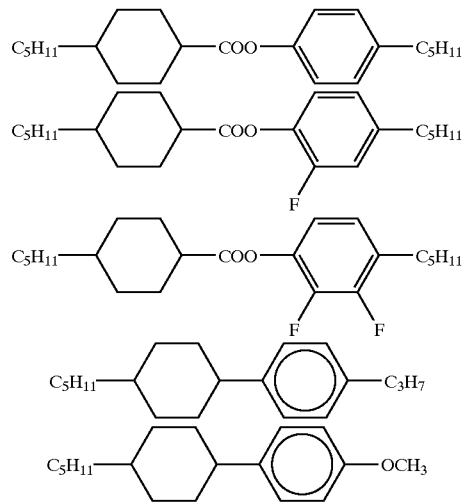

Liquid crystals can be found in nature (or synthesized) with either positive or negative $\Delta\epsilon$. Thus, in more detailed aspects of the invention, it is possible to use a liquid crystal which has a positive $\Delta\epsilon$ at low frequencies, but becomes negative at high frequencies. The frequency (of the applied voltage) at which $\Delta\epsilon$ changes sign is called the cross-over frequency. The cross-over frequency will vary with liquid crystal composition, and typical values range from 1–10 kHz. Thus, by operating at the proper frequency, the reflection grating may be switched. In accordance with the invention, it is expected that low cross-over frequency materials can be prepared from a combination of positive and negative dielectric anisotropy liquid crystal. A suitable positive dielectric liquid crystal for use in such a combination contains four ring esters as shown below:

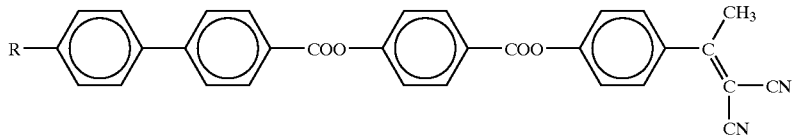

A strongly negative dielectric liquid crystal suitable for use in such a combination is made up of pyridazines as shown below:

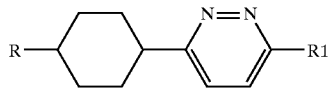

Both liquid crystal materials are available from LaRoche & Co., Switzerland. By varying the proportion of the positive and negative liquid crystals in the combination, crossover frequencies from 1.4–2.3 kHz are obtained at room temperature. Another combination suitable for use in the present embodiment is a combination of the following: p-pentylphenyl-2-chloro-4-(p-pentylbenzoyloxy) benzoate and 4-(p-pentylbenzoyloxy) benzoate and p-heptylphenyl-2-chloro-4-(p-octylbenzoyloxy) benzoate. These materials are available from Kodak® Company.

Now that the unique and advantageous optical and electrical qualities of the PDLC material used herein have been set forth, the technique for reproducing holograms within this type of PDLC material will be described.

Referring once again to FIG. 3 a system 30 for reproducing a switchable transmission hologram from a master hologram 35 is shown. For recording a transmission hologram, the master hologram 35 is mounted in the path of an incident beam 33 at the Bragg angle. A PDLC blank 37 is optically contacted to the master hologram 35 at the same angle to form a master/blank assembly. Finally, an absorption filter 30 (e.g., neutral density) may optionally be placed behind the PDLC blank 37 in order to absorb extraneous radiation and avoid spurious reflections which may lead to the formation of unwanted interferograms within the PDLC blank 37. The master/blank assembly of master hologram 35, PDLC blank 37, and, optionally, absorption filter 30 is then illuminated using a single coherent incident beam 33 from radiation source 31.

Utilizing the hologram duplication system of FIG. 3, the radiation source 31 emits a coherent radiation beam 33 (e.g., laser) that is directed towards a first surface of the master hologram 35. Within master hologram 35, part of incident beam 33 is diffracted by the holographic grating 56, forming diffracted beam 34, and part of the incident beam 33 is transmitted undiffracted, forming transmitted beam 36. Both diffracted beam 34 and transmitted beam 36 pass through the second surface of the master hologram 35 and into the optically contacted first surface of the PDLC blank 37. Within the PDLC blank 37, the transmitted beam 36 and the diffracted beam 34 interfere, forming a replica of holographic grating 56 therein.

Given a master hologram diffraction efficiency of 50%, wherein 50% of the incident beam power is diffracted as diffracted beam 34 and 50% of the incident beam power is transmitted as transmitted beam 36, a 1:1 beam ratio will result. While 50% is often an ideal diffraction efficiency in the master for optimal hologram reproduction, varying diffraction efficiencies will still result in a replica hologram.

Referring to FIG. 4, a system 40 for reproducing reflection holograms according to an embodiment of the present invention is shown. While similar to the transmission reproduction system 30 of FIG. 3, the reflection reproduction system 40 requires that PDLC blank 37 be located before the master hologram 35 within the optical path, followed by an absorption filter 39. As in FIG. 3, the PDLC blank 37, master hologram 35 and filter 39 configuration is oriented at the Bragg angle with respect to the coherent incident beam 33 from radiation source 31.

Utilizing the hologram duplication system of FIG. 4, the radiation source 31 emits a coherent radiation beam 33 (e.g., laser) that is directed towards a first surface of the PDLC blank 37. The incident beam 33 is transmitted through the PDLC blank 37 as transmitted beam 36, passing through the second surface thereof and enters the first surface of the master hologram 35 which is optically contacted to the second surface of the PDLC blank 37. Within the master hologram 35, the incident beam 33 is diffracted by the holographic grating 56 located therein, creating diffracted beam 34. Transmitted beam 36 and diffracted beam 34 interfere within the PDLC blank 37 forming a replica of holographic grating 56 therein.

In the case of a reflection hologram, given a master hologram with a diffraction efficiency of 100%, wherein 100% of incident beam 33 is diffracted as beam 34 and the amount of incident beam 33 that is transmitted 36 is negligible, a 1:1 beam ratio will result. However, a master hologram with a lower diffraction efficiency will still result in a replica hologram.

In the representative embodiments described above, the master hologram is not limited to a PDLC hologram. The master hologram may be, but is not limited to, a computer generated hologram, any of a variety of emulsion-type holograms, a photopolymer hologram, a photochromic hologram, a polymer dispersed liquid crystal hologram, silver halide photographic emulsion hologram, dichromated gelatin hologram, photoresist hologram, photothermoplastic hologram, photorefractive crystal hologram, multiplexed hologram, white light hologram, rainbow hologram, thin holograms, in-line hologram, off-axis hologram, fourier hologram, fraunhofer hologram, diffractive optical element (DOE), holographic optical element (HOE), evanescent-wave hologram, image hologram, amplitude hologram, phase hologram, volume hologram, surface hologram, transmission hologram, reflection hologram, or silver-halide sensitized gelatin hologram. Further, in order to fully take advantage of the switching characteristics inherent in the liquid crystal component of the PDLC material, electrodes may be attached to ITO glass slides (as described in FIG. 6) of either one or the other or both the master hologram 35 and the PDLC blank 37. By controlling the orientation of the liquid crystal layer of either the master hologram 35 or the PDLC blank 37 during the duplication process, the replica holograms may be formed so as to diffract either with the application of a specified voltage or in the absence of the application of a specified voltage, in order to meet design and system specifications.

While the aforementioned embodiments do not require a switchable holographic-PDLC ("H-PDLC") master, there are situations where it is advantageous to utilize a switchable H-PDLC master in the hologram replication process. In the following embodiments, the blanks are not restricted to the PDLC material described herein. One skilled in the art recognizes the alternative materials which may be used for the replica in the proceeding embodiments of the present invention.

In an embodiment of the present invention wherein an H-PDLC switchable master is advantageously utilized, the blank is exposed prior to recording in order to improve uniformity of the hologram and for aesthetic reasons. Pre-recording in this context means prior to exposure of the H-PDLC master. One skilled in the art will recognize when such pre-recording irradiation is necessary based on the composition of the blank. For example, the materials discussed in K. T. Weitzel et al., "Hologram recording in DuPont photopolymer films by use of pulse exposure," Opt. Lett. 22, 1899 (1997) and V. N. Mikhailov et al., "Pulse Hologram Recording in DuPont's Photopolymer Films," *Proc. SPIE* 3011, 200 (1997) both of which are incorporated by reference herein, benefit from pre-recording irradiation.

Figure 9A:
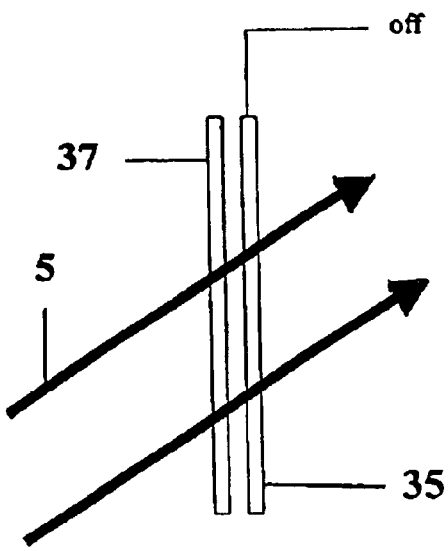
FIGS. 9a, 9b, 9c, 9d, 9e, and 9f are pre-recording, exposure, and post-recording views of a contact printing system incorporating a switchable H-PDLC master according to an embodiment of the present invention.
Figure 9B:
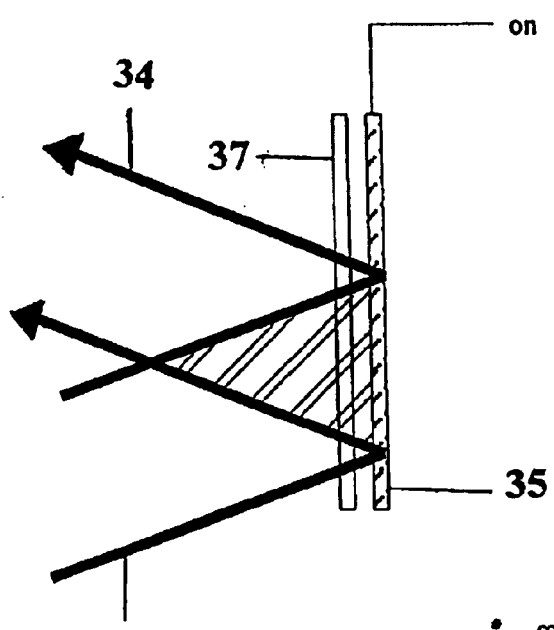
Figure 9C:
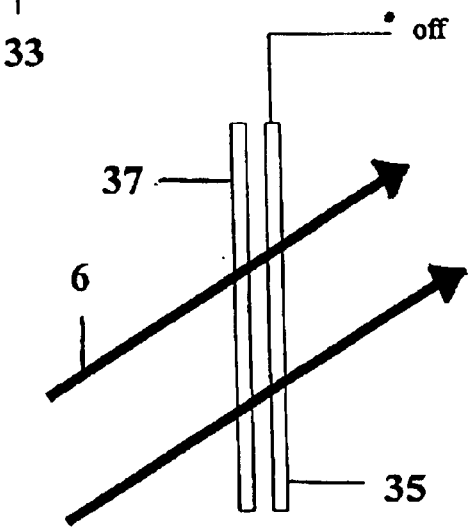
Figure 9D:
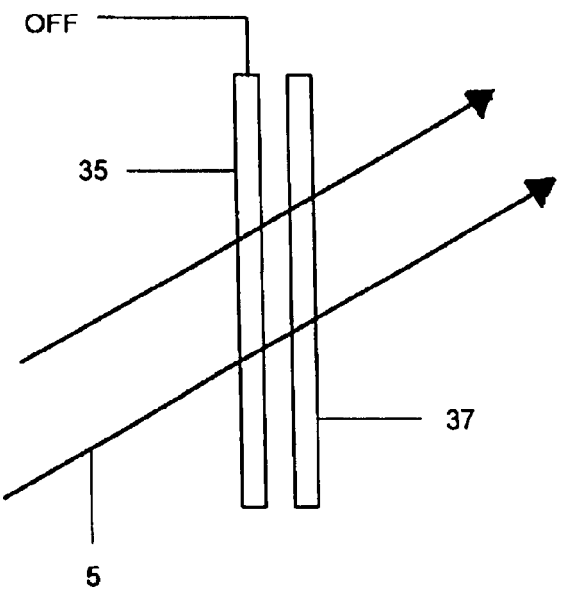

Since the method of reproduction in the embodiments of the present invention is contact reproduction, the master and the blank are in close physical and optical proximity. If the master hologram is not capable of being switched OFF, any exposure radiation through the master hologram, will necessarily cause a pattern to be created within the blank. But, in the case where the master hologram is an H-PDLC master, the holographic nature of the master may actually be turned OFF and ON under electrical control, such that in the OFF state, the H-PDLC master resembles a piece of transparent glass as shown in FIG. 9a. In FIG. 9a, the H-PDLC master reflection hologram 35 is turned OFF, such that the liquid crystals do not orient so as to form a holographic grating within the H-PDLC master. Consequently, a pre-recording beam 5 passes through the PDLC blank 37 and the H-PDLC master 35 without being reflected back through the PDLC blank and forming an interference pattern therein. In the case of a transmission H-PDLC master, as shown in FIG. 9d the order of the PDLC blank 37 and the H-PDLC master 35 is reversed, such that the pre-recording beam 5 first passes through the master 35 which is OFF and then passes through the blank 37, without forming any interference pattern within in the blank 37. Pre-recording beam 5 may be the same beam as recording incident beam 33 or it may be an auxiliary beam.

Similar to the pre-recording embodiment described above, one skilled in the art recognizes that post-recording irradiation may also be advantageous for certain contact replication scenarios. Post-recording exposure is useful with certain recording photopolymer materials (see e.g., Chemistry of Materials) for eliminating unconverted monomers and bleaching unconsumed photosensitive dye. For example, it may be necessary to further expose the replicated hologram in order to permanently set the recording therein. In FIG. 9b, a reflection H-PDLC master 35 is ON when incoming beam 33 is incident thereon and is reflected as beam 34 so as to interfere within the blank 37 with incident beam 33, forming an interference region therein. In a situation where post-recording irradiation of the replication is necessary, the master hologram 35 is turned OFF and a post-recording beam 6 is incident upon what is now the replica of the master but, for simplicity, what we will continue to refer to as the blank 37 but, is not reflected back through by the master 35 because the grating therein is not ON (see FIG. 9c).

Figure 9E:
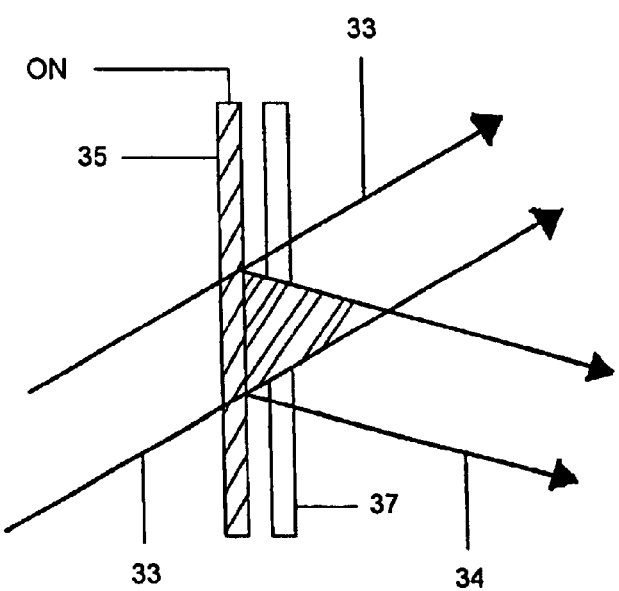
Figure 9F:
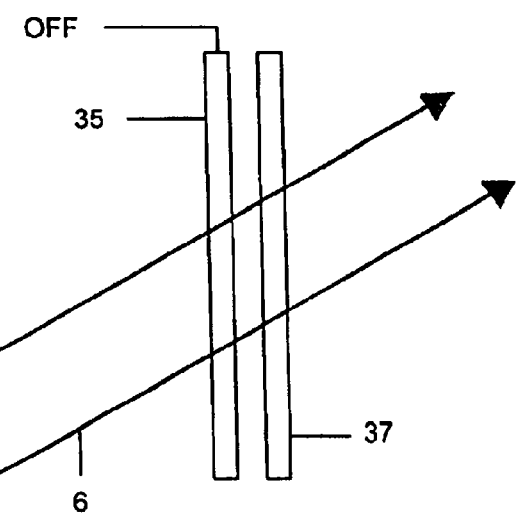

As with the pre-recording situation, post-recording may also take place when replicating a transmission hologram. Referring to FIG. 9e replication of a transmission master 35 occurs when an incident beam 33 passes through an ON master 35, wherein part of the incident beam is deflected by the hologram pattern formed therein resulting in diffracted beam 34. Beams 33 and 34 interfere within the blank 37 to form a replica of the hologram pattern of the master 35. After this replication step has occurred, it is preferable in some situations to irradiate the now replica (used to be blank) 37 with a post-recording beam 6 as shown in FIG. 9f. Consequently, after the blank 37 has been exposed with the hologram of the master 35, the master 35 is turned OFF and a post-recording beam 6 is direct through the master 35 and into the replica 37, without re-forming the hologram of the master 35 but merely allowing the beam to pass unmodulated, through the master 35. Post-recording beam 6 may be the same beam as recording incident beam 33 or it may be an auxiliary beam.

Both the pre-recording and the post-recording embodiments utilizing the H-PDLC master improve the efficiency of contact printing. Without the benefit of the switchable master, there are significant physical changes to the printing component which must occur before and after the actual exposure. First, the blank would have to be pre-exposed without being in optical contact with the master, next for the recording step, the master would have to be optically contacted thereto, and finally, for post-recording, the master would have to be removed from the blank (now replica) prior to irradiation of the blank with the post-recording beam. These multiple configurations for pre-recording exposure, recording exposure, and post-recording exposure add significant time to the contact printing process and reduce efficiency. Using the H-PDLC master, allows for a single configuration during the performance of all three exposure steps.

In another embodiment of the present invention, using a switchable H-PDLC master allows for substantial control of diffraction efficiency. When contact printing planar transmission gratings, the incident beam is split into two beams, a transmitted beam and a diffracted beam. The optimum beam balance between the transmitted and diffracted beams is often 1:1 since the beams are overlapping to form the replica holographic transmission grating within the blank. With a static master hologram, the diffraction efficiency may not be selectively turned OFF and ON and it is not variable. Consequently, given a static hologram which does not meet the 1:1 requirement, there is a limitation in the quality of the replica due to the non-optimal diffraction efficiency. In an embodiment wherein the master is a switchable H-PDLC, the diffraction efficiency is voltage controlled. Consequently, the optimum efficiency can in effect be tuned in. This ability to change or tune the diffraction efficiency in order to achieve the optimal 1:1 power ratio is extremely useful where the hologram to be replicated is complex. For example, where the master hologram is a lens or some other complicated fringe pattern, the diffraction efficiency may be manipulated in order to find the beam ratio, be it 1:1 or otherwise, that produces the replica with highest fidelity.

Figure 10A:
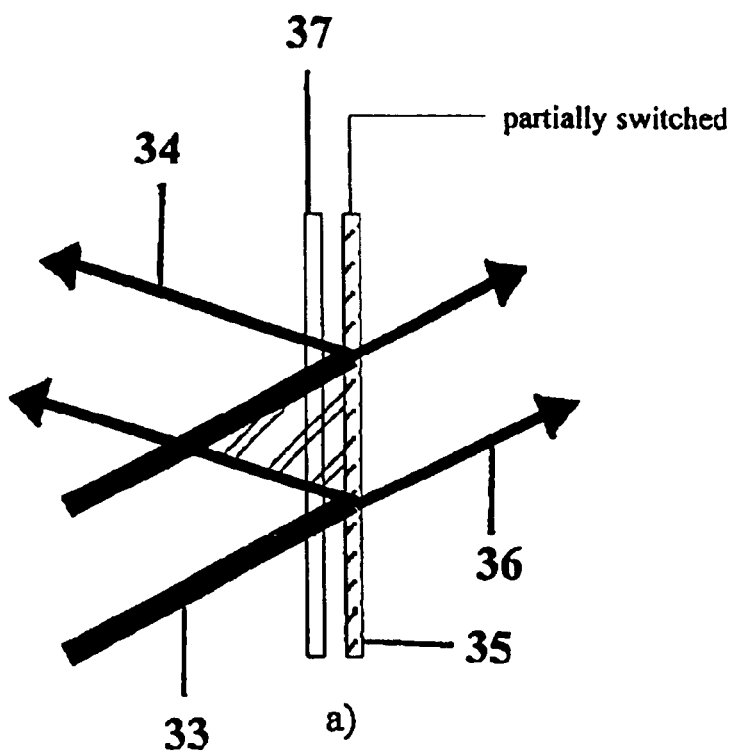
FIGS. 10a and 10b are reflection and transmission exposure views wherein a switchable H-PDLC master is partially switched according to an embodiment of the present invention.
Figure 10B:
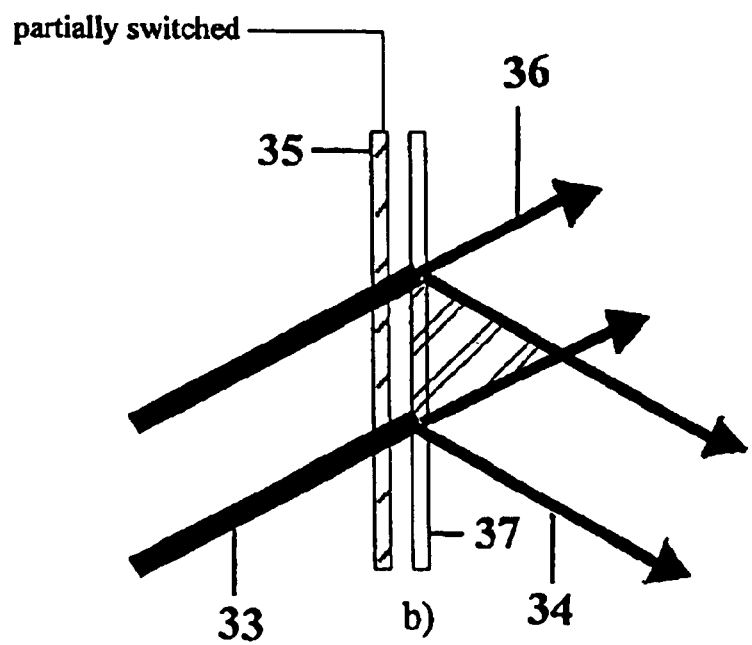

Referring to FIG(s). 10a and 10b, incident recording beam 33 is split into transmitted beam 36 and diffracted beam 34 by only partially switching the master H-PDLC hologram 35. The ability to partially switch the master is analogized to an analog signal as opposed to a digital signal. Instead of choosing from two states, all ON or all OFF, a partially switchable H-PDLC master allows for a range of diffraction efficiencies. For example, as the applied voltage varies through a range, the diffraction efficiency of the master also varies through a range. In FIG. 10a, a reflective master is contact printed when the incident beam 33 and the diffracted beam 34 interfere within the blank 37. Due to the use of the switchable H-PDLC master, the power of the diffracted beam may be varied with voltage as desired. Similarly, in FIG. 10*b*, the transmitted beam 36 and the diffracted beam 34 interfere within the blank 37 and both the transmitted beam power and the diffracted beam power are capable of voltage control.

In another embodiment of the present invention, the switchable H-PDLC master is utilized in order to create replica holograms with tailored diffraction efficiency through decreased fringe contrast. In many material systems, holographic exposure with low fringe contrast will result in a replica with less than optimum diffraction efficiency. By adjusting the diffraction efficiency of the switchable master, the writing beams become imbalanced (or the optimum balance for the system is altered) and thus a decreased replica diffraction efficiency results. There are situations where a power ratio other than 1:1 is desired during the replication process (see e.g., D. J. Lougnot et al., "Photopolymers for Holographic Recording: IV. New Self-processing Formulations Based on β-hydroxy ethyloxazolidone acrylate," *Pure Appl. Opt.* 2, 383 (1993) incorporated herein by reference). In a particular embodiment benefiting from this method, a single switchable H-PDLC master is able to produce multiple replicated static holograms with identical prescriptions but with various diffraction efficiencies. Without the partial switching capability of the H-PDLC master, multiple static masters with varying photopolymer recipes must be used to create this result. This method and system are cumbersome and inefficient. Additionally, decreased diffraction efficiency can also be achieved by decreasing the overall incident power. However, the total incident power in that case would not be maintained so as to preserve reaction rates within the blank. This embodiment of the present invention preserves the total power incident on the blank to preserve reaction rates.

Figure 11B:
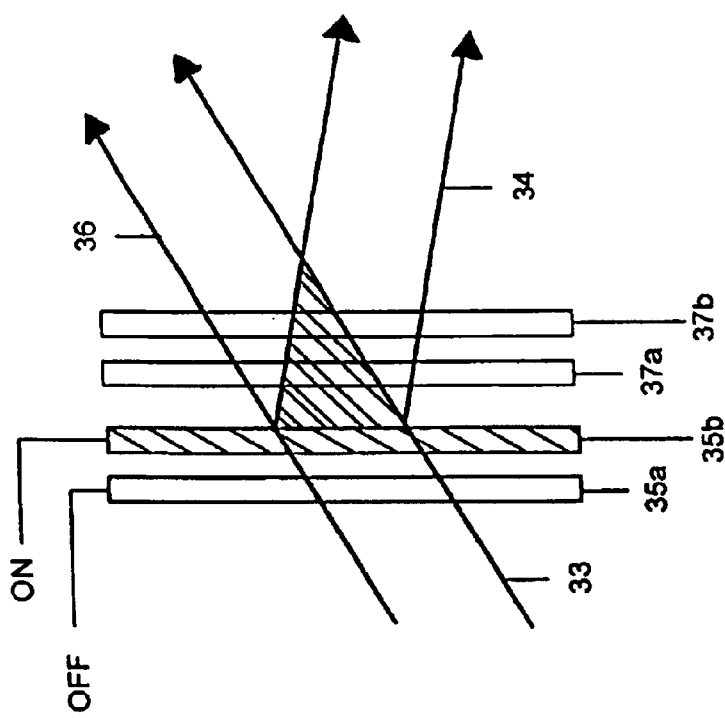
Figure 11A:
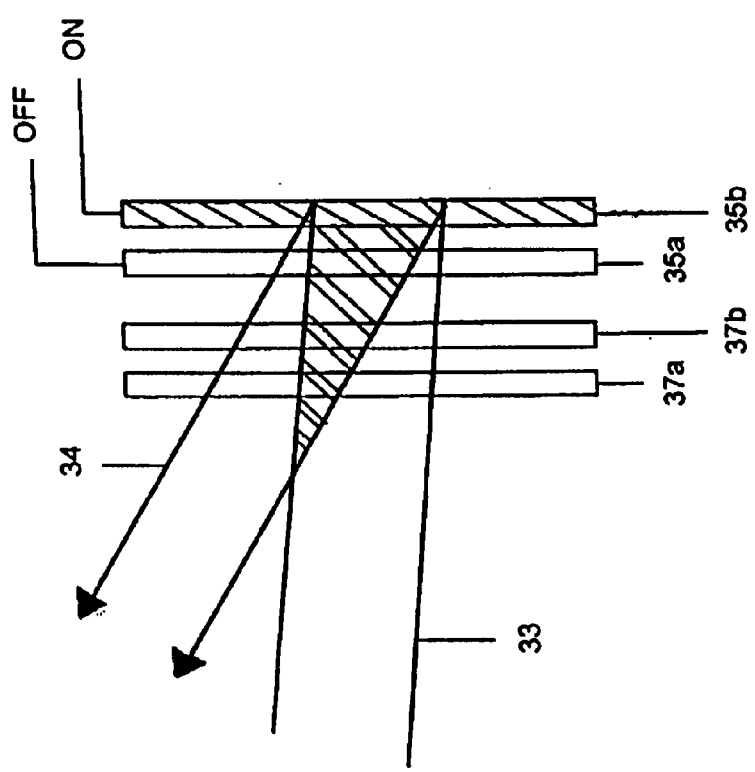

Further embodiments of the present invention comprise a stack of switchable H-PDLC masters. As with non-holographic lens configurations forming an optical train (e.g., camera lenses), two or more stacked holographic lenses, either reflection or transmission, comprising an optical train also require precise predetermined alignment of their optical centers or registration, as it is referred to by those skilled in the art. An embodiment of the present invention utilizes two or more switchable H-PDLC masters to consecutively record two or more independent holographic lenses. Referring to FIG. 11(*a*), when contact printing multiple reflection masters in accordance with a preferred embodiment of the present invention, the first replica lens 37*a* is recorded with the first master 35*a* switched ON and the second master 35*b* switched OFF (not shown). Next, the second replica lens 37*b* is recorded with the second master 35*b* switched ON and the first master 35*a* switched OFF. Similarly, referring to FIG. 11(*b*), when contact printing multiple transmission masters in accordance with a preferred embodiment of the present invention, the first replica lens 37*a* is recorded with the first master 35*a* switched ON and the second master 35*b* switched OFF (not shown). Next, the second replica lens 37*b* is recorded with the second master 35*b* switched ON and the first master 35*a* switched OFF. By sequentially switching the masters, interference and cross talk are eliminated during replication. One skilled in the art will appreciate that the masters must be designed, recorded and registered appropriately, considering parameters such as the distance between corresponding master/replica pairs, spectral properties, etc., in order to yield the proper optical properties and registration in the replica stack.

Another preferred embodiment of the present invention is a system and method for mass producing a Red-Green-Blue (RGB) holographic lens stack according to the principles illustrated with regard to FIG(s). 11(*a*)–(*b*). Holographic lenses have unique applications in the art of personal displays in that their optical properties cannot be reproduced with conventional refractive optics. In such personal displays a color image is produced by rapidly sequencing independent red, green, and blue images. To avoid color cross talk and interference, switchable H-PDLC lenses are employed, allowing only the appropriate color hologram(s) to be ON during the RGB sequence. Precise registration of the RGB H-PDLC stack is required so that the three monochrome images overlap. Current manufacturing procedures require each monochrome hologram to be independently recorded in independent complex optical rigs that require painstaking alignment. This alignment must be such that each hologram is placed in a precise location in a substrate blank of specific dimensions. Each monochrome hologram is recorded using a laser of a similar wavelength. If successful, the three monochrome holograms will register when they are physically stacked and aligned. Registration can be compromised if any one recording rigs become misaligned or the blank substrate dimensions is out of specification. This manufacturing technique is subject to serious downtime and costly maintenance. The following method and system of an embodiment of the present invention eliminate the complex alignment in the mass production step and thus reduce the risk of production delays.

Initially, a master set of holograms is designed, recorded, and registered into a master switchable holographic stack, taking into account the required replica optical design, registration, blank substrate dimensions, etc. A fixture is provided to hold the master and replica stacks in optical contact. Next, stable, optically clean and uniform laser beams of three different wavelengths (e.g., red, green, blue) are provided to illuminate the master/replica assembly. The angle of incidence of each of the RGB beams onto the master/replica assembly is set according to the master designs.

Figure 12A:
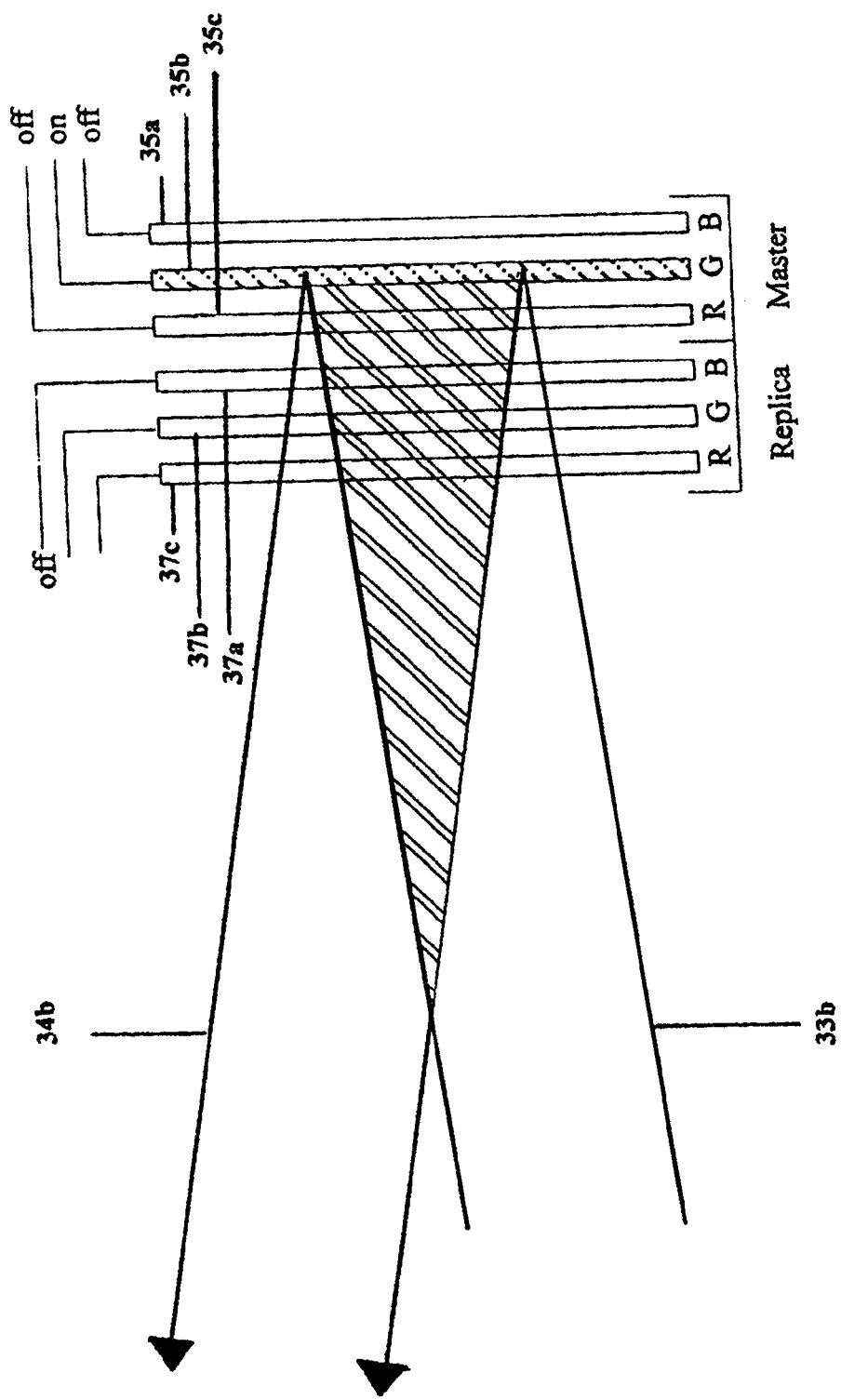
Figure 12B:
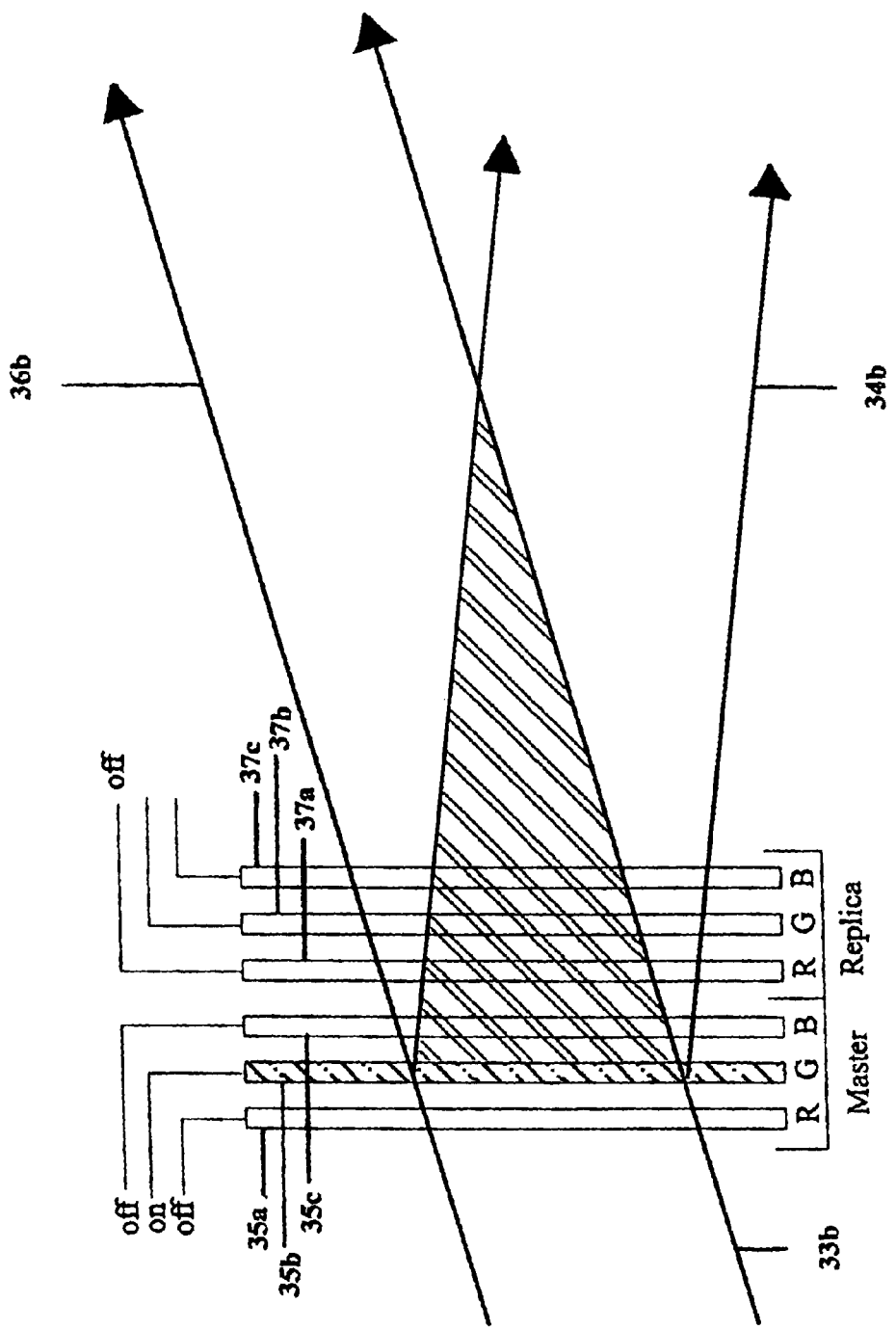

Following the sequence set forth in TABLE 1 and referencing FIG(s). 12(*a*)–(*b*), the recording of the master switchable holographic stack is described. In FIG. 12(*a*), a stack of reflective RGB H-PDLC masters is contact printed. First, if necessary based on the material comprising the blue blank 37*a*, a pre-recording irradiation is performed while all masters and blanks are OFF, utilizing the blue laser beam or an appropriate auxiliary beam. Next, while recording the blue H-PDLC master 35*a* onto the designated blue blank 37*a*, all masters and blanks excepting the blue H-PDLC master 35*a* are switched OFF, leaving only the blue H-PDLC master 35*a* ON and irradiated by the blue laser. Following the recording step, if post-recording exposure is necessary, again, all masters, remaining red and green blanks and the blue replica are switched OFF while the blue laser or an auxiliary beam irradiates the blue replica.

After the blue blank (now replica) 37*a* has been recorded, the green blank 37*b*, is pre-exposed (if necessary) utilizing the green laser or an auxiliary beam, while all masters, the red and green blanks, and the blue replica are switched OFF. As is specifically shown in FIG. 12(*a*), while recording the green H-PDLC master 35*b* utilizing green incident beam 33*b*, the blue and red masters 35*a*, 35*c*, the red and green blanks 37*b*, 37*c*, and the blue replica 37*a*, remain switched OFF, while the green master 35*b* is switched ON. Green incident beam 33*b* and diffracted beam 34*b* interfere within the green blank 37*b* to form the replica. Following the recording step, if post-recording exposure is necessary, all masters, the red blank, and the blue and green replicas are switched OFF while the green replica is irradiated with the green laser or an auxiliary beam.

Finally, after the blue blank (now replica) 37a and green blank (now replica) 37b have been recorded, the red blank 37c, is pre-exposed (if necessary) utilizing the red laser or an auxiliary beam, while all masters, the red blank, and the blue and green replicas are switched OFF. While recording the red H-PDLC master 35c utilizing the red laser, the blue and green masters, the red blank, and the blue and green replicas, remain switched OFF, while the red master 35c is switched ON. Following the recording step, if post-recording exposure is necessary, all masters and the blue, green, and red replicas are switched OFF while the red replica is irradiated with the red laser or an auxiliary beam.

When recording a stack of transmission RGB H-PDLC masters, the sequence described above is applicable. The only difference lies in the interacting beams used to form the interference pattern within the appropriate blank during the recording step. For example, referring to FIG. 12(b), while recording the green H-PDLC master 35b utilizing green incident beam 33b, the blue and red masters 35a, 35c, the red and green blanks 37b, 37c, and the blue replica 37a, remain switched OFF, while the green master 35b is switched ON. Unlike in the reflection recording step, the diffracted beam 34b and the transmitted beam 36b interfere within the green blank 37b to form the replica.

TABLE 1

Sample Switching Sequence in an RGB Stack Produced by Contact Holography

| | Red Blank/ Replica | Green Blank/ Replica | Blue Blank/ Replica | Red Master | Green Master | Blue Master |
|---|---|---|---|---|---|---|
| Pre-ex Blue | N/A | N/A | N/A | Off | Off | Off |
| Expose Blue | N/A | N/A | N/A | Off | Off | ON |
| Post-ex Blue | N/A | N/A | N/A | Off | Off | Off |
| Pre-ex Green | N/A | N/A | Off | Off | Off | Off |
| Expose Green | N/A | N/A | Off | Off | ON | Off |
| Post-ex Green | N/A | N/A | Off | Off | Off | Off |
| Pre-ex Red | N/A | Off | Off | Off | Off | Off |
| Expose Red | N/A | Off | Off | ON | Off | Off |
| Post-ex Red | N/A | Off | Off | Off | Off | Off |

In constructing the system described in the previous embodiment for contact printing of multiple stacked holograms of varying colors, considerations must be given to the photo-sensitive materials used in the replica blanks to ensure that they do not spectrally overlap. Further, one skilled in the art recognizes that the aforementioned embodiments are merely representative of the multiple useful configurations and methods which are possible when a switchable PDLC master and/or blank are incorporated therein.

The replica PDLC holograms resulting from the systems and methods described above, because of the switching properties of the liquid crystal component of the PDLC material, may be switched accordingly from a diffractive to a transmissive state. Consequently, the duplication method described above allows for increased efficiency and reproducibility of switchable holographic elements. These switchable holographic elements find use in all areas of technology utilizing optical switches including the telecommunications and imaging technologies.

Given the aforementioned examples of hologram reproduction using a single beam approach with a PDLC blank, one skilled in the art is readily aware of the importance of this improved method when considering the manufacturing process of, for example, holographic lenses which use complex optical geometries. The set-up time is considerably reduced and the overall reproducibility from one hologram to another is significantly increased.

Further, one skilled in the art recognizes that the embodiments illustrated herein are merely exemplary and that the inventive concepts may be practiced in any number of alternate embodiments while remaining within the scope of the present invention.

We claim:

1. A method for contact recording at least one hologram comprising:

arranging at least a first master hologram having an electrically controllable, continuously variable diffraction efficiency including at least diffraction efficiency states ON and OFF and at least a first holographic blank in optical contact and a second master hologram with electrically controllable variable diffraction efficiency and a second holographic blank in optical contact to form a master/blank assembly;

exposing the master/blank assembly to a pre-recording beam; and exposing the master/blank assembly to a recording beam, the continuously variable first master hologram is switched OFF during exposure of the master/blank assembly to the pre-recording beam and the first master hologram is switched ON during exposure of the master/blank assembly to the recording beam, thereby forming a first replica of the first master hologram in the first holographic blank;

wherein the master/blank assembly remains optically contacted throughout each exposure thereby forming the first replica of the at least a first master hologram in the at least a first holographic blank, wherein the first replica exhibits the electrically controllable, continuously variable diffraction efficiency of the at least a first master hologram and includes diffraction efficiency states ON and OFF; and further wherein the first master hologram and the first replica are switched OFF during each of the following, exposure of the second holographic blank to a pre-recording beam, recording of the second master hologram with electrically controllable variable diffraction efficiency in the second holographic blank, and exposure of a resulting second replica to a post-recording beam.

2. The method according to claim 1, further comprising exposing the master/blank assembly to a post-recording beam.

3. The method according to claim 2, wherein the first master hologram is switched OFF during exposure of the master/blank assembly to the post-recording beam.

4. The method according to claim 2, wherein the pre-recording beam, the recording beam, and the post-recording beam are the same beam.

5. The method according to claim 2, wherein of the pre-recording beam, the recording beam, and the post recording beam at least one is different from the others.

6. The method according to claim 1, wherein the first replica is formed of a polymer-dispersed liquid crystal material.

7. The method according to claim 1, wherein the first master hologram and the second master hologram are the same master hologram.

8. A system for contact recording multiple holograms comprising:
- a first, second, and third master hologram with variable diffraction efficiencies;
- a first, second, and third holographic blank wherein the first, second, and third master hologram and the first, second, and third holographic blanks are in optical contact, forming a stack; and
- a first, second, and third recording beam, wherein when the first recording beam is incident upon the stack, the first master hologram is ON and the second and third master holograms are OFF, forming a first replica hologram with variable diffraction efficiency of the first master hologram in the first holographic blank; when the second recording beam is incident on the stack, the first and third master holograms are OFF, the first replica hologram is OFF, and the second master hologram is ON, forming a second replica hologram with variable diffraction efficiency of the second master hologram in the second holographic blank; when the third recording beam is incident on the stack, the first and second master holograms are OFF, the first and second replica holograms are OFF, and the third master hologram is ON, forming a third replica hologram with variable diffraction efficiency of the third master hologram in the third holographic blank.

9. A method for contact printing multiple master holograms comprising:
- providing a stack comprised of first, second, and third master holograms with variable diffraction efficiencies and first, second, and third holographic blanks that are in optical contact;
- switching ON the first master hologram;
- exposing the stack with a first recording beam, forming a first replica hologram with variable diffraction efficiency within the first holographic blank;
- switching OFF the first master hologram and switching ON the second master hologram;
- exposing the stack with a second recording beam, forming a second replica hologram with variable diffraction efficiency within the second holographic blank;
- switching OFF the second master hologram and switching ON the third master hologram; and
- exposing the stack with a third recording beam, forming a third replica hologram with electrically controllable variable diffraction efficiency within the third holographic blank.

* * * * *

UNITED STATES PATENT AND TRADEMARK OFFICE
CERTIFICATE OF CORRECTION

PATENT NO. : 6,730,442 B1
DATED : May 4, 2004
INVENTOR(S) : Richard L. Sutherland et al.

It is certified that error appears in the above-identified patent and that said Letters Patent is hereby corrected as shown below:

Title page,
Item [56], References Cited, FOREIGN PATENT DOCUMENTS, add the following:

| | | | |
|---|---|---|---|
| GB 2 292 745 | 3/6/96 | Merck Patent GmbH | C09K / 19/44 |
| DE 44 08 746 A1 | 9/21/95 | Medolas Ges Fuer Medizintechni | A61B / 17/36 |
| EP 0 672 386 A1 | 9/20/95 | Surgical Systems & Instruments, Inc. | A61B / 17/22 |
| WO 95/17127 | 6/29/95 | Rygaard, Jorgen | A61B / 17/11 |
| GB 2 281 566 | 3/8/95 | Merck Patent GmbH | C09K / 19/30 |
| JP 6-190185 | 4/27/94 | Zanussi Elettrodomestici (IT) | D06F / 39/12 |
| WO 94/04958 | 3/3/94 | Merck Patent GmbH | G02F / 1/1333 |
| EP 0 422 689 A2 | 4/17/91 | Mountpelier Investments, S.A. | A61M / 25/00 |
| SU 1635966 | 3/23/91 | Sverdlovsk G Med. Inst. | A61B / 17/00 |
| GB 2 222 696 | 3/14/90 | Exitech Ltd. | G03H / 1/04 |
| WO 89/06264 | 7/13/89 | Hughes Aircraft Company | C09K / 19/00 |
| WO 81/00668 | 3/19/81 | Jansen, Anton | A61B / 17/11 |
| CA 544591 | 8/6/57 | National Research Development Corp. | |

OTHER PUBLICATIONS, add the following:

International Search Report for Application No. PCT/US97/12577, dated January 14, 1998 (mailing date)

Written Opinion for Application No. PCT/US97/12577, dated April 28, 1998 (mailing date)

Preliminary Examination Report for Application No. PCT/US97/12577, dated September 3, 1998 (mailing date)

European Search Report for Application No. EP 97 93 7988, dated October 13, 1999

International Search Report for Application No. PCT/US00/34661, dated July 17, 2001

International Search Report for Application No. PCT/US01/40691, dated September 5, 2001 (mailing date)

International Search Report dated September 5, 2001

International Preliminary Examination Report for Application No. PCT/US00/34661, dated February 20, 2002

Written Opinion for Application No. PCT/US01/40691, dated May 15, 2002 (mailing date)

Preliminary Examination Report for Application No. PCT/US01/40691, dated September 10, 2002 (mailing date)

R. T. Pogue, et al., "Monomer Functionality Effects in the Anisotropic Phase Separation of Liquid Crystals," Polymer 41, pp. 733-741, 2000

M. Escuti, et al., "5.3: A Model of the Fast-Switching Polymer-Stabilized IPS Configuration," SID International Symposium, Digest of Technical Papers, First Edition, pp. 32-35, May, 1999

C. C. Bowley, et al., "45.3: Electro-Optic Investigations of H-PDLCS: The Effect of Monomer Functionality on Display Performance," SID International Symposium, Digest of Technical Papers, First Edition, pp. 958-961, May, 1999

C. C. Bowley, et al., "Advances in Holographic Polymer Dispersed Liquid Crystal Technology;" in Liquid Crystal–Materials and Devices, Mat. Res. Soc. Symposium Proceedings, Vol. 559, pp. 97-107, 1999

C. C. Bowley, et al., "Morphology of Holographically-Formed Polymer Dispersed Liquid Crystals (H-PDLC)," Mol. Cryst. Liq. Cryst., Vol. 331, pp. 209-216, 1999

UNITED STATES PATENT AND TRADEMARK OFFICE
CERTIFICATE OF CORRECTION

PATENT NO. : 6,730,442 B1
DATED : May 4, 2004
INVENTOR(S) : Richard L. Sutherland et al.

It is certified that error appears in the above-identified patent and that said Letters Patent is hereby corrected as shown below:

Title page (cont'd),

M. Date, et al., "Full-Color Reflective Display Device Using Holographically Fabricated Polymer-Dispersed Liquid Crystal (HPDLC)," Journal of the Society for Information Display (SID), Vol. 7, pp. 17-22, 1999

J. A. Firehammer, et al., "Lasing Pixels: A New Application for Polymer Dispersed Liquid Crystals (PDLCs)," Mol. Cryst. Liq. Cryst., Vol. 331, pp. 165-172, 1999

Seferis, James C., "Refractive Indices of Polymers," Polymer Handbook, 4th Edition, John Wiley & Sons, Inc., pp. 571-582, Copyright 1999

Richard L. Sutherland, et al., "Switchable Holograms for Displays and Other Applications," SPIE Proceedings, Vol. 3421, pp. 8-18, June, 1998

L. V. Natarajan, et al., "Holographic PDLCs for Optical Beam Modulation, Deflection, and Dynamic Filter Applications," SPIE Proceedings, Vol. 3292, pp. 44-51, January 28-29,1998

L. V. Natarajan, et al., "Electrically Switchable Holograms Containing Novel PDLC Structures," SPIE Proceedings, Vol. 3143, pp. 182-190, July 28-29,1997

N. M. Lawandy, et al., "L1.3: Lasing Pixel PDLC Light Valves for Projection Applications," SID International Symposium, Digest of Technical Papers, First Edition, pp. 1001-1004, May, 1997

G. P. Crawford, et al., "Reflective Color LCDs Based on H-PDLC and PSCT Technologies," Journal of the Society for Information Display, Vol. 5, No. 1, pp. 45-48, 1997

D. Schwarze-Haller and F. Noack, "Nuclear Magnetic Resonance Field-Cycling Proton Relaxation Study of Polymer Dispersed Liquid Crystals," J. Chem. Phys., Vol. 105, No. 11, pp. 4823-4832, September, 1996

Lawrence H. Domash, et al., "Switchable-Focus Lenses in Holographic Polymer Dispersed Liquid Crystal," SPIE, Vol. 2689, pp. 188-194, May, 1996

Richard L. Sutherland, et al., "The Physics of Photopolymer-Liquid Crystal Composite Holographic Gratings," SPIE Proceedings, Vol. 2689, pp. 158-169, May, 1996

R. L. Sutherland, et al., "Switchable Bragg Gratings Formed in situ Within a Polymer-Dispersed Liquid Crystal Composite Medium," Materials Research Society Symp. Proc., Vol. 425, pp. 331-341, April 8-11, 1996

Timothy J. Bunning, et al., "The Effects of Eliminating the Chain Extender and Varying the Grating Periodicity on the Morphology of Holographically Written Bragg Gratings," SPIE Proceedings, Vol. 2651, pp. 44-54, January 31 – February 1, 1996

T. J. Bunning, et al., "Morphology of Reflection Holograms Formed in situ Using Polymer-Dispersed Liquid Crystals," Polymer, Vol. 37, No. 14, pp. 3147-3150, 1996

G. S. Iannacchione, et al., "Deuterium NMR and Morphology Study of Polymer-Dispersed Liquid-Crystal Bragg Gratings," Europhysics Letters, Vol. 36, No. 6, pp. 425-430, 1996

Richard L. Sutherland, et al., "Analysis of Periodic Polymer-Dispersed Liquid Crystal Structures for Dynamic Hologram Applications," SPIE Proceedings, Vol. 2532, pp. 309-318, July 10-12, 1995

N. Kawatsuki and H. Ono, "Electro-Optical Properties of Polymer/(Liquid Crystal) Composite Film Fabricated by Two-Step Phase Separation Method," Chemistry Letters, No. 5, pp. 333-334, 1995

R. L. Sutherland, et al., "Electrically Switchable Volume Gratings in Polymer-Dispersed Liquid Crystals," Appl. Phys. Lett., Vol. 64, No. 9, pp. 1074-1076, February 28, 1994

UNITED STATES PATENT AND TRADEMARK OFFICE
CERTIFICATE OF CORRECTION

PATENT NO. : 6,730,442 B1
DATED : May 4, 2004
INVENTOR(S) : Richard L. Sutherland et al.

It is certified that error appears in the above-identified patent and that said Letters Patent is hereby corrected as shown below:

Title page (cont'd),

K. Tanaka, et al., "Holographically Formed Liquid-Crystal/Polymer Device for Reflective Color Display," Journal of the Society for Information Display, Vol. 2, No. 1, pp. 37-38, 1994

L. Domash, et al., "Programmable Beamlet Generator, Dynamic Lens, and Optical Memory Using Electrically Switched Holographic Devices," SPIE Proceedings, Vol. 2026, pp. 642-652, November, 1993

Hideya Murai, et al., "Electro-Optic Properties for Liquid Crystal Phase Gratings," SPIE Proceedings, Vol. 1665, pp. 230-239, February 11-13, 1992

Lawrence H. Domash, "Applications of Dynamic Holograms for Quasi-Volume Storage," SPIE Proceedings, Very Large Optical Memories-Materials and System Architectures, Vol. 1773, 5 pp., 1992

Richard T. Ingwall and Timothy Adams, "Hologram: Liquid Crystal Composites, SPIE Proceedings, Vol. 1555, pp. 279-290, July 24-25, 1991

A. M. Lackner, et al., "Droplet Size Control in Polymer Dispersed Liquid Crystal Films," SPIE Proceedings, Vol. 1080, pp. 53-61, January 17-18, 1989

Hori, Asai, and Fukai, "Field-Controllable Liquid-Crystal Phase Grating," IEEE, Vol. ED-16, p. 1734 (4 pp.), 1979

R. A. Kashnow and J. E. Bigelow, "Diffraction From a Liquid Crystal Phase Grating," Applied Optics, Vol. 12, No. 10, pp. 2302-2304, October, 1973

Stoke, Funkhouser, Leonard, Indebetoew, and Zech, "Hand-Held Holography," 1 p., September 19, 1966

Signed and Sealed this

Seventh Day of February, 2006

JON W. DUDAS
*Director of the United States Patent and Trademark Office*